US010386692B2

(12) United States Patent
Moriwaki et al.

(10) Patent No.: US 10,386,692 B2
(45) Date of Patent: Aug. 20, 2019

(54) ELECTROPHORETIC ELEMENT AND DISPLAY DEVICE

(71) Applicant: SHARP KABUSHIKI KAISHA, Sakai, Osaka (JP)

(72) Inventors: Hiroyuki Moriwaki, Sakai (JP); Hiromi Katoh, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 1 day.

(21) Appl. No.: 15/570,287

(22) PCT Filed: Apr. 26, 2016

(86) PCT No.: PCT/JP2016/063048
§ 371 (c)(1),
(2) Date: Oct. 27, 2017

(87) PCT Pub. No.: WO2016/175205
PCT Pub. Date: Nov. 3, 2016

(65) Prior Publication Data
US 2018/0143503 A1 May 24, 2018

(30) Foreign Application Priority Data
Apr. 28, 2015 (JP) ................... 2015-091568
Dec. 18, 2015 (JP) ................... 2015-247284

(51) Int. Cl.
G02B 26/00 (2006.01)
G02F 1/167 (2019.01)
(Continued)

(52) U.S. Cl.
CPC ............... *G02F 1/167* (2013.01); *G09F 9/37* (2013.01); *G09G 3/344* (2013.01); *G09G 2320/0666* (2013.01)

(58) Field of Classification Search
CPC ............. G02F 1/167; G02F 2001/1676; G02F 2203/30; G02F 1/13338; G02F 1/1339;
(Continued)

(56) References Cited

U.S. PATENT DOCUMENTS

2004/0150325 A1 8/2004 Yamakita et al.
2005/0002088 A1 1/2005 Ukigaya
(Continued)

FOREIGN PATENT DOCUMENTS

JP 2004-258615 A 9/2004
JP 2004-333864 A 11/2004
(Continued)

OTHER PUBLICATIONS

Hiji et al., Novel Color Electrophoretic E-Paper Using Independently Movable Colored Particles, SID 2012 Digest, pp. 85-87.
(Continued)

*Primary Examiner* — Brandi N Thomas
(74) *Attorney, Agent, or Firm* — ScienBiziP, P.C.

(57) ABSTRACT

An electrophoretic element according to an embodiment of the present invention includes: a first substrate and a second substrate facing each other; and an electrophoretic layer provided between the first substrate and the second substrate, and has a plurality of pixels. In each pixel, the electrophoretic layer includes a dispersion medium, and a plurality of types of electrophoretic particles dispersed in the dispersion medium. The plurality of types of electrophoretic particles include first electrophoretic particles and second electrophoretic particles that are charged with the same polarity and have different threshold characteristics from each other. In each pixel, the electrophoretic element includes at least three electrodes to which different potentials can be applied. As seen from a layer normal direction of the electrophoretic layer, the at least three electrodes (Continued)

include a first electrode, a second electrode and a third electrode that are placed in this order along a certain direction that is parallel to a substrate surface of the first substrate, and the third electrode is provided in the opening region of each pixel.

16 Claims, 30 Drawing Sheets

(51) Int. Cl.
*G09F 9/37* (2006.01)
*G09G 3/34* (2006.01)

(58) Field of Classification Search
CPC .... G02F 1/172; G02F 1/19; G02F 2001/1678; G02F 2201/124; G02F 2203/34
USPC ............... 359/237, 242, 265–267, 270–273, 359/290–292, 295, 296, 298
See application file for complete search history.

(56) References Cited

U.S. PATENT DOCUMENTS

| | | | |
|---|---|---|---|
| 2005/0104844 A1* | 5/2005 | Nakai | G09G 3/3446 345/107 |
| 2008/0303778 A1 | 12/2008 | Machida et al. | |
| 2009/0268274 A1 | 10/2009 | Masuzawa et al. | |
| 2010/0060623 A1 | 3/2010 | Van Delden et al. | |
| 2011/0007381 A1* | 1/2011 | Paolini, Jr. | G02F 1/167 359/296 |
| 2011/0043441 A1 | 2/2011 | Tokunaga et al. | |
| 2012/0138922 A1 | 6/2012 | Yamazaki et al. | |
| 2012/0256893 A1 | 10/2012 | Sakamoto et al. | |

FOREIGN PATENT DOCUMENTS

| | | |
|---|---|---|
| JP | 2005-031345 A | 2/2005 |
| JP | 2008-304530 A | 12/2008 |
| JP | 2009-009092 A | 1/2009 |
| JP | 2010-511195 A | 4/2010 |
| JP | 2012-134475 A | 7/2012 |
| JP | 2012-220693 A | 11/2012 |
| JP | 5333045 B2 | 11/2013 |

OTHER PUBLICATIONS

Mukherjee et al., The Biprimary Color System for E-Paper: Doubling Color Performance Compared to RGBW, SID 2014 Digest, pp. 869-872.

* cited by examiner (a) LOWEST GRAY LEVEL
(b) GRAY LEVEL A
(c) GRAY LEVEL B (a) STEP 1 (MAGENTA OUTPUT)

(b) STEP 2

(c) STEP 3 (YELLOW OUTPUT)

BLACK DISPLAY (MIXED COLOR DISPLAY BETWEEN CYAN, MAGENTA AND YELLOW)

(a) STEP 1 (CYAN·MAGENTA OUTPUT)

(b) STEP 2

(c) STEP 3 (YELLOW OUTPUT)

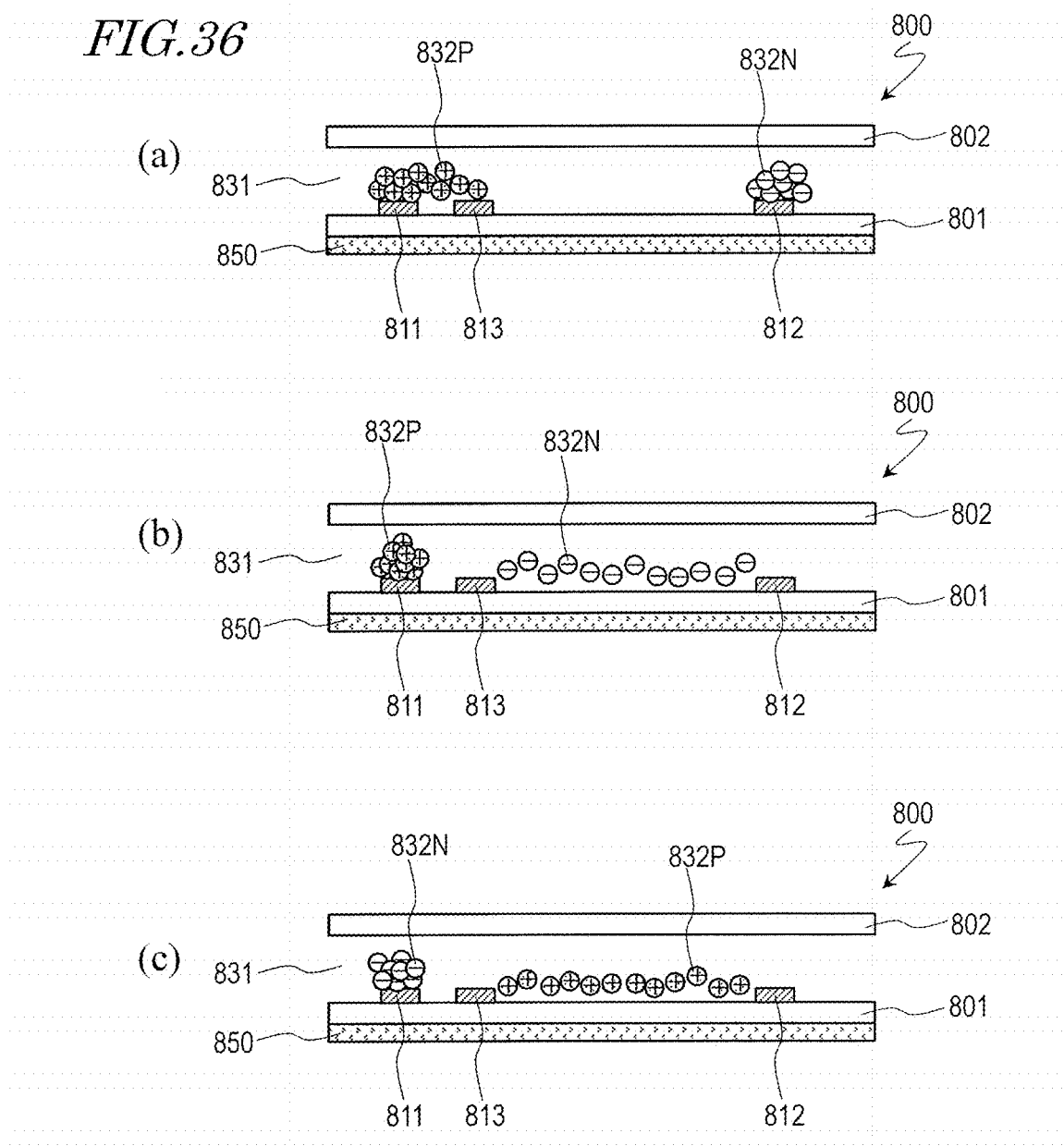

ELECTROPHORETIC ELEMENT AND DISPLAY DEVICE

TECHNICAL FIELD

The present invention relates to an electrophoretic element. The present invention also relates to a display device including an electrophoretic element.

BACKGROUND ART

In recent years, electrophoretic displays have been drawing attention as a reflective display device having a low power consumption and a good visibility. Patent Document No. 1 and Non-Patent Document No. 1 each disclose an electrophoretic display capable of producing color display as well as black and white display.

FIG. 34 shows an electrophoretic display 700 disclosed in Patent Document No. 1. FIG. 34 is a cross-sectional view schematically showing the electrophoretic display 700.

As shown in FIG. 34, the electrophoretic display 700 includes a TFT substrate 710, a counter substrate 720 that faces the TFT substrate 710, and an electrophoretic layer 730 provided between the TFT substrate 710 and the counter substrate 720.

The TFT substrate 710 includes a plurality of TFTs 711 arranged in a matrix pattern, and pixel electrodes 712 electrically connected respectively to the TFTs 711. The plurality of TFTs 711 and the pixel electrodes 712 are supported by a glass substrate 710a.

The counter substrate 720 includes a counter electrode 722 provided so as to face the pixel electrode 712. The counter electrode 722 is supported by a glass substrate 720a.

The electrophoretic layer 730 includes a dispersion medium 731, and cyan-colored, magenta-colored and yellow-colored electrophoretic particles (hereinafter referred to respectively as "cyan particles", "magenta particles" and "yellow particles") 732C, 732M and 732Y dispersed in the dispersion medium 731. The electrophoretic layer 730 further includes white-colored supports 733 for holding cyan particles 732C, magenta particles 732M and the yellow particles 732Y.

The cyan particles 732C, the magenta particles 732M and the yellow particles 732Y are charged with the same polarity and have different threshold voltages from each other. The supports 733 are charged with a different polarity from the cyan particles 732C, the magenta particles 732M and the yellow particles 732Y.

With the electrophoretic display 700, the cyan particles 732C, the magenta particles 732M and the yellow particles 732Y are moved in the thickness direction (cell thickness direction) of the electrophoretic layer 730 by using a vertical electric field that is generated in the electrophoretic layer 730 when a voltage is applied between the pixel electrode 712 and the counter electrode 722. Patent Document No. 1 proposes an approach in which a voltage is applied through the electrophoretic layer 730 while properly varying the applied voltage level over a plurality of subframes, thereby individually controlling the density distribution of the various particles in the cell thickness direction, thus realizing multi-gray level display.

FIG. 35 shows the electrophoretic display 800 proposed in Non-Patent Document No. 1. FIG. 35 is a cross-sectional view schematically showing an area corresponding to one pixel of the electrophoretic display 800.

As shown in FIG. 35, the electrophoretic display 800 includes a lower glass substrate 801, an upper glass substrate 802, and oil 831 sealed therebetween. First particles 832P and second particles 832N are dispersed in the oil 831. The first particles 832P are positively charged, and the second particles 832N are negatively charged. The first particles 832P and the second particles 832N are in colors (e.g., magenta and green) that are complementary to each other.

A first migration electrode 811, a second migration electrode 812 and a gating electrode 813 are provided on the lower glass substrate 801. The first migration electrode 811 is placed at one end of the pixel, and the second migration electrode 812 is placed at the other end of the pixel. The gating electrode 813 is placed between the first migration electrode 811 and the second migration electrode 812. Note however that the gating electrode 813 is located in the vicinity of the first migration electrode 811. That is, the interval between the first migration electrode 811 and the gating electrode 813 is significantly smaller than the interval between the gating electrode 813 and the second migration electrode 812. When there is a potential difference between adjacent ones of the first migration electrode 811, the second migration electrode 812 and the gating electrode 813, a transverse electric field is generated between the electrodes, and the first particles 832P and/or the second particles 832N migrate in accordance with the transverse electric field. The region between the gating electrode 813 and the second migration electrode 812 is the region (opening region) that contributes to display. A back reflector 850 is placed on the back side of the lower glass substrate 801.

Referring to FIGS. 36(a), 36(b) and 36(c), display principles of the electrophoretic display 800 will now be described.

The electrophoretic display 800 is switched between four states shown in FIG. 35, FIGS. 36(a), 36(b) and 36(c) by controlling the relative levels of the potentials applied to the first migration electrode 811, the second migration electrode 812 and the gating electrode 813.

In the state shown in FIG. 35, the first particles 832P and the second particles 832N are both positioned between the gating electrode 813 and the second migration electrode 812. Therefore, this state produces display based on subtractive color mixing between the color of the first particles 832P and the color of the second particles 832N, i.e., black display.

In the state shown in FIG. 36(a), neither one of the first particles 832P and the second particles 832N is positioned between the gating electrode 813 and the second migration electrode 812. Therefore, this state produces display based on light that is reflected by the back reflector 850, i.e., white display.

In the state shown in FIG. 36(b), only the second particles 832N, of the first particles 832P and the second particles 832N, are positioned between the gating electrode 813 and the second migration electrode 812. Therefore, this state produces display of the color of the second particles 832N (e.g., green).

In the state shown in FIG. 36(c), only the first particles 832P, of the first particles 832P and the second particles 832N, are positioned between the gating electrode 813 and the second migration electrode 812. Therefore, this state produces display of the color of the first particles 832P (e.g., magenta).

Thus, the electrophoretic display 800 of Non-Patent Document No. 1 realizes color display by using the three electrodes 811, 812 and 813 that generate a transverse electric field, and two types of particles 832P and 832N that are charged with different polarities from each other.

CITATION LIST

Patent Literature

[Patent Document No. 1] Japanese Laid-Open Patent Publication No. 2012-220693

Non-Patent Literature

[Non-Patent Document No. 1] S. Mukherjee, and seven others, "The Biprimary Color System for E-Paper: Doubling Color Performance Compared to RGBW", SID Digest, 2014, pp. 869-872

SUMMARY OF INVENTION

Technical Problem

The electrophoretic display 700 of Patent Document No. 1 and the electrophoretic display 800 of Non-Patent Document No. 1 each have problems as follows.

The electrophoretic display 700 of Patent Document No. 1 is based on a scheme utilizing a vertical electric field that acts on the entire pixel, and it is difficult to completely independently control the migrations of the cyan particles 732C, the magenta particles 732M and the yellow particles 732Y. Therefore, crosstalk occurs (when a vertical electric field is applied to the electrophoretic layer 730, the cyan particles 732C, the magenta particles 732M and the yellow particles 732Y move together at the same time). Thus, it is not possible to realize a fine gray level representation.

The electrophoretic display 700 of Patent Document No. 1 also has a problem in that all the particles are positioned within the opening region (a region within a pixel that contributes to display), thus resulting in particles that are not needed for display contributing to display.

With the electrophoretic display 800 of Non-Patent Document No. 1, even if one attempts to locate an intended amount of each of the two types of particles in the opening region, both of the particles (charged with different polarities from each other) move together at the same time in response to an applied electric field. That is, crosstalk occurs. Therefore, it is not possible to produce gray level display by individually controlling the amount of each type of particles.

The present invention has been made in view of the problems set forth above, and an object thereof is to realize a fine gray level representation with an electrophoretic element capable of producing color display.

Solution to Problem

An electrophoretic element according to an embodiment of the present invention is an electrophoretic element including: a first substrate and a second substrate facing each other; an electrophoretic layer provided between the first substrate and the second substrate; and a plurality of pixels each including an opening region through which light is transmitted from the electrophoretic layer to a front side, wherein: in each of the plurality of pixels, the electrophoretic layer includes a dispersion medium, and a plurality of types of electrophoretic particles dispersed in the dispersion medium; the plurality of types of electrophoretic particles include first electrophoretic particles and second electrophoretic particles that are charged with the same polarity and have different threshold characteristics from each other; in each of the plurality of pixels, the electrophoretic element includes at least three electrodes to which different potentials can be applied; as seen from a layer normal direction of the electrophoretic layer, the at least three electrodes include a first electrode, a second electrode and a third electrode that are placed in this order along a certain direction that is parallel to a substrate surface of the first substrate; and the third electrode is provided in the opening region.

In one embodiment, one or more of the plurality of types of electrophoretic particles can be moved, each in an intended amount, to the opening region by controlling potentials of the at least three electrodes.

In one embodiment, when moving one of the plurality of types of electrophoretic particles to the opening region, only the electrophoretic particles of said one type are positioned over the second electrode and then moved to the opening region.

In one embodiment, the intended amount is controlled by adjusting an intensity of an electric field applied to the electrophoretic layer in the opening region and/or a length of time over which the electric field is applied to the electrophoretic layer in the opening region.

In one embodiment, the electrophoretic element further includes a thin film transistor electrically connected to each of the at least three electrodes, a scanning line electrically connected to a gate electrode of the thin film transistor, and a signal line electrically connected to a source electrode of the thin film transistor, thereby enabling active matrix driving, wherein a length of time over which an electric field is applied to the electrophoretic layer in the opening region is equivalent to a vertical scanning period times n (n is an integer that is 1 or more).

In one embodiment, an intensity of an electric field applied to the electrophoretic layer in the opening region is controlled by adjusting a level of a source voltage supplied from the signal line to the thin film transistor.

In one embodiment, a vertical scanning frequency is 150 Hz or less, and a response speed of the plurality of types of electrophoretic particles is 1 sec or more.

In one embodiment, the plurality of types of electrophoretic particles further include third electrophoretic particles that are charged with the same polarity as the first electrophoretic particles and the second electrophoretic particles and have different threshold characteristics from the first electrophoretic particles and the second electrophoretic particles.

In one embodiment, the first electrophoretic particles, the second electrophoretic particles and the third electrophoretic particles are cyan-colored electrophoretic particles, magenta-colored electrophoretic particles and yellow-colored electrophoretic particles.

In one embodiment, the plurality of types of electrophoretic particles further include fourth electrophoretic particles that are charged with a different polarity from the first electrophoretic particles, the second electrophoretic particles and the third electrophoretic particles.

In one embodiment, the fourth electrophoretic particles are black-colored electrophoretic particles.

In one embodiment, the at least three electrodes further include a fourth electrode; and as seen from a layer normal direction of the electrophoretic layer, the first electrode, the second electrode, the third electrode and the fourth electrode are placed in this order along the certain direction that is parallel to the substrate surface of the first substrate.

In one embodiment, the third electrode is a reflective electrode having a light-reflecting property.

In one embodiment, the electrophoretic element further includes a light-reflecting layer or a light-absorbing layer that is provided in the opening region on a back side relative to the electrophoretic layer.

In one embodiment, the first substrate includes the first electrode, the second electrode and the third electrode.

In one embodiment, the first substrate includes the first electrode and the second electrode; and the second substrate includes the third electrode.

A display device according to an embodiment of the present invention includes an electrophoretic element configured as set forth above.

Advantageous Effects of Invention

According to an embodiment of the present invention, it is possible to realize a fine gray level representation with an electrophoretic element capable of producing color display.

BRIEF DESCRIPTION OF DRAWINGS

FIG. 36 (a) to (c) are diagrams illustrating display principles of the electrophoretic display 800 of Non-Patent Document No. 1.

DESCRIPTION OF EMBODIMENTS

Embodiments of the present invention will now be described with reference to the drawings. Note that the present invention is not limited to the following embodiments.

Embodiment 1

Figure 1:
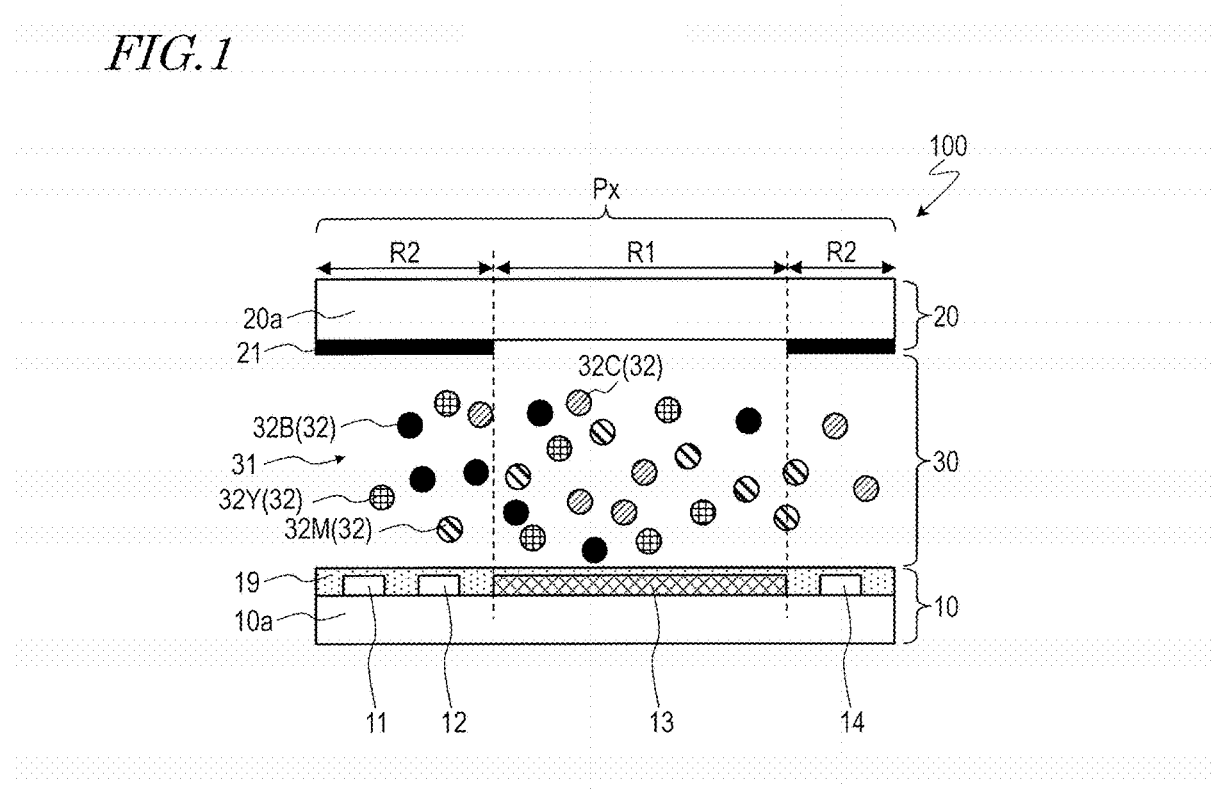
FIG. 1 A cross-sectional view schematically showing an electrophoretic element (display device) 100 according to an embodiment of the present invention.

FIG. 1 shows an electrophoretic element (display device) 100 of the present embodiment. FIG. 1 is a cross-sectional view schematically showing one pixel Px of the electrophoretic element 100.

As shown in FIG. 1, the electrophoretic element 100 includes a first substrate 10 and a second substrate 20 facing each other, and an electrophoretic layer 30 provided between the first substrate 10 and the second substrate 20. In the example shown in FIG. 1, the first substrate 10 is placed on the back side (the side opposite from the observer), and the second substrate 20 is placed on the front side (the observer side).

The electrophoretic element 100 also includes a plurality of pixels Px. The plurality of pixels Px each include an opening region R1. The opening region R1 is a region through which light is transmitted from the electrophoretic layer 30 to the front side. In a region R2, other than the opening region R1, of each pixel Px, a light-blocking layer 21 is provided located on the front side relative to the electrophoretic layer 30. Hereinafter, the region R2 may be referred to as a "light-blocking region".

In each pixel Px, the electrophoretic layer 30 includes a dispersion medium 31, and a plurality of types of electrophoretic particles 32 dispersed in the dispersion medium 31. In the present embodiment, the plurality of types of electrophoretic particles 32 include cyan-colored electrophoretic particles (cyan particles) 32C, magenta-colored electrophoretic particles (magenta particles) 32M, yellow-colored electrophoretic particles (yellow particles) 32Y and black-colored electrophoretic particles (black particles) 32B.

The cyan particles 32C, the magenta particles 32M and the yellow particles 32Y are charged with the same polarity (herein, the positive polarity), and have different threshold characteristics from each other. The black particles 32B are charged with a different polarity (herein, the negative polarity) from the cyan particles 32C, the magenta particles 32M and the yellow particles 32Y.

In each pixel Px, the first substrate 10 includes four (four types of) electrodes 11, 12, 13 and 14 to which different potentials can be applied. The four electrodes (specifically, the first electrode 11, the second electrode 12, the third electrode 13 and the fourth electrode 14) are supported by a transparent substrate 10a. An insulating layer 19 is formed so as to cover the first electrode 11, the second electrode 12, the third electrode 13 and the fourth electrode 14.

As seen from the layer normal direction of the electrophoretic layer 30 (the direction normal to the substrate surface of the first substrate 10), the first electrode 11, the second electrode 12, the third electrode 13 and the fourth electrode 14 are placed in this order along a certain direction (the direction from the left side toward the right side in FIG. 1) that is parallel to the substrate surface of the first substrate 10. The first electrode 11, the second electrode 12 and the fourth electrode 14 are provided in the light-blocking region R2. In contrast, the third electrode 13 is provided in the opening region R1. The third electrode 13 is a reflective electrode having a light-reflecting property.

The second substrate 20 includes a transparent substrate 20a. Herein, the light-blocking layer 21 is placed on the electrophoretic layer 30 side of the transparent substrate 20a.

The electrophoretic element 100 of the present embodiment is capable of applying a transverse electric field to the electrophoretic layer 30 by controlling the potentials of the four electrodes 11, 12, 13 and 14, and to thereby move (output) one or more of the plurality of types of electrophoretic particles 32, each in an intended amount, to the opening region R1. Display principles of the electrophoretic element 100 will now be described. First, the threshold characteristics of the electrophoretic particles 32 will be described.

[Threshold Characteristics of Electrophoretic Particles]

Figure 2:
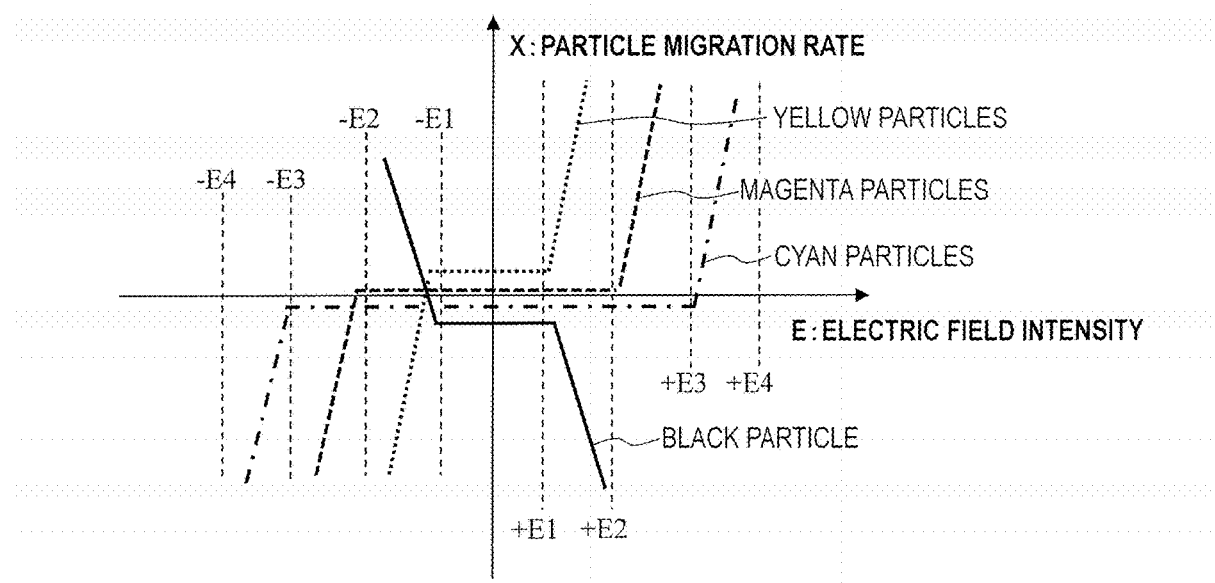
FIG. 2 A graph showing an example of threshold characteristics of cyan particles 32C, magenta particles 32M, yellow particles 32Y and black particles 32B included in an electrophoretic layer 30 of the electrophoretic element 100.

FIG. 2 shows an example of threshold characteristics of the cyan particles 32C, the magenta particles 32M, the yellow particles 32Y and the black particles 32B. FIG. 2 is a graph whose horizontal axis represents the electric field intensity E and whose vertical axis represents the particle migration rate X. The absolute values |E1|, |E2|, |E3| and |E4| of the electric field intensities+E1, +E2, +E3, +E4, −E1, −E2, −E3 and −E4 shown in FIG. 2 satisfy the relationship |E1|<|E2|<|E3|<|E4|. As can be seen from FIG. 2, the cyan particles 32C move in the positive direction when +E3<E and move in the negative direction when E<−E3. Similarly, the magenta particles 32M move in the positive direction when +E2<E and move in the negative direction when E<−E2, and the yellow particles 32Y move in the positive direction when +E1<E and move in the negative direction when E<−E1. The black particles 32B move in the negative direction when +E1<E and move in the positive direction when E<−E1. As used in the present specification, the voltage (electric field intensity) at which the electrophoretic particles 32 start to move may be referred to as the threshold voltage (threshold electric field intensity).

Thus, the cyan particles 32C, the magenta particles 32M and the yellow particles 32Y are charged with the same polarity, and have different threshold voltages from each other. This is because the amount of charge varies between the cyan particles 32C, the magenta particles 32M and the yellow particles 32Y.

Figure 3:
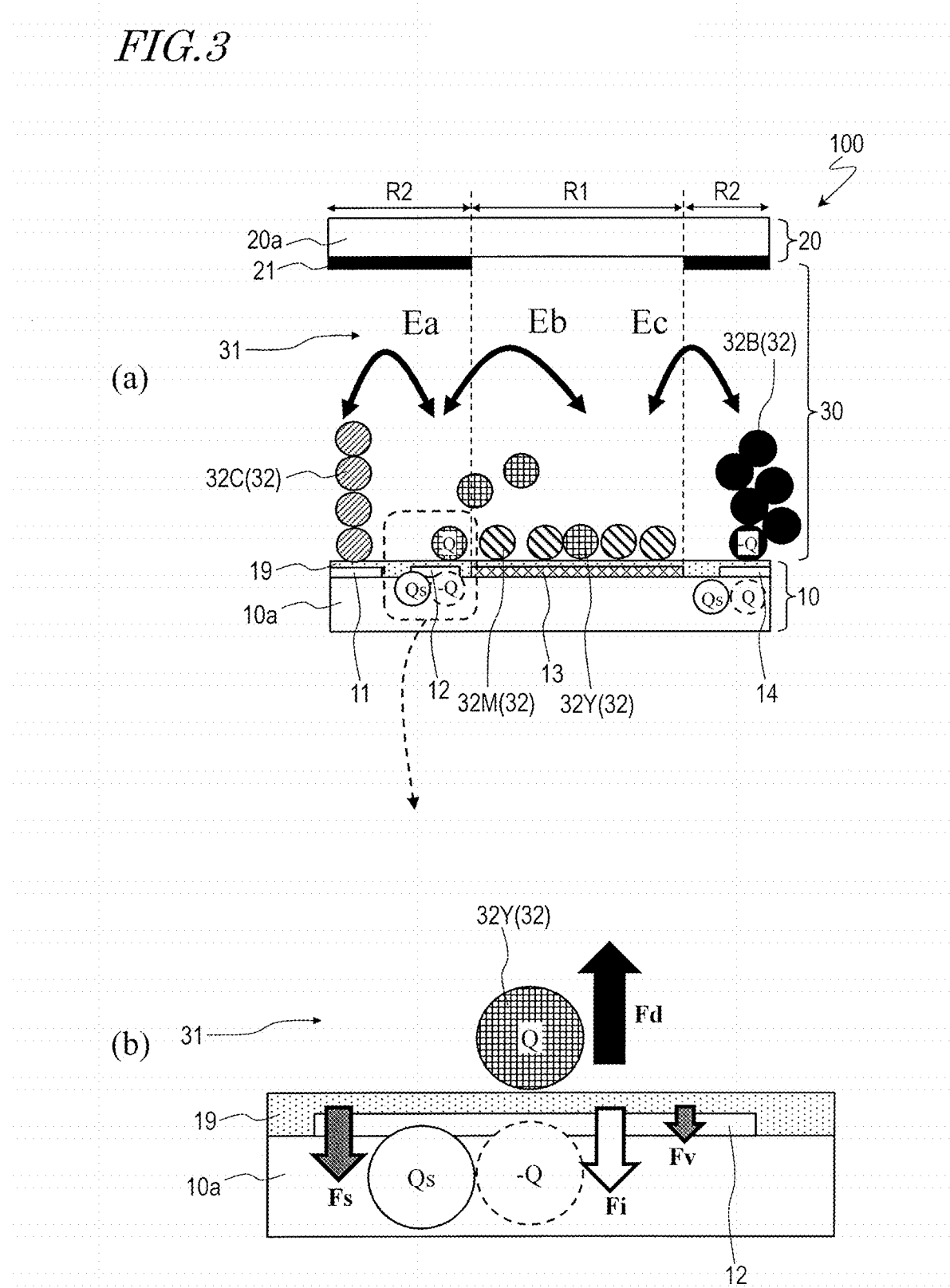
FIGS. 3 (a) and (b) are diagrams illustrating a reason why different thresholds can be expressed because of the amount of charge varying between different electrophoretic particles 32.

Referring to FIGS. 3(a) and 3(b), a reason why different thresholds can be expressed due to variations of the amount of charge will be described. FIG. 3(a) is a cross-sectional view schematically showing a state in which a transverse electric field is applied to the electrophoretic layer 30, and FIG. 3(b) is an enlarged view of an area delimited by a dotted line in FIG. 3(a).

With the electrophoretic element 100, the first substrate 10 is provided with the four electrodes 11, 12, 13 and 14 to which different potentials can be applied. Therefore, as shown in FIG. 3(a), three electric fields independent of each other can be generated in the electrophoretic layer 30. Specifically, an electric field in accordance with the potential difference between the first electrode 11 and the second electrode 12 (represented by double-pointed arrow Ea in FIG. 3(a)) is generated between the first electrode 11 and the second electrode 12. An electric field in accordance with the potential difference between the second electrode 12 and the third electrode 13 (represented by double-pointed arrow Eb in FIG. 3(a)) is generated between the second electrode 12 and the third electrode 13, and an electric field in accordance with the potential difference between the third electrode and the fourth electrode 14 (represented by double-pointed arrow Ec in FIG. 3(a)) is generated between the third electrode 13 and the fourth electrode 14.

Herein, two different forces acting upon the electrophoretic particles 32 positioned over an electrode, i.e., the electrostatic force Fd acting to separate the electrophoretic particles 32 off the electrode, and the gravitational force Fa between the electrophoretic particles 32 and the first substrate 10 (i.e., a force that urges the electrophoretic particles 32 to remain over the electrode). FIG. 3(b) illustrates the yellow particles 32Y over the second electrode 12.

The electrostatic force Fd described above is represented by Expression (1) below. In Expression (1), Q is the charge of the electrophoretic particles 32, and E is the electric field generated in the electrophoretic layer 30.

$$Fd = Q \cdot E \tag{1}$$

The gravitational force Fa described above is represented by Expression (2) below. In Expression (2), Fv is the van der Waals force, Fi is the image force, and Fs is the electrostatic force between the charge of the insulator (herein, the insulating layer 19) (or the charge of the electrode) and the electrophoretic particles 32.

$$Fa = Fv + Fi + Fs \quad (2)$$

The image force Fi is represented by Expression (3) below, and the electrostatic force Fs is represented by Expression (4) below. Herein, $C_1$ in Expression (3) is a constant, $C_2$ in Expression (4) is a constant, and Qs is the charge of the insulator.

$$Fi = C_1 \cdot Q^2 \quad (3)$$

$$Fs = C_2 \cdot Q \cdot Qs \quad (4)$$

Herein, the threshold voltage of the electrophoretic particles 32 corresponds to the electric field Eth when the electrostatic force Fd and the gravitational force Fa are in balance with each other (in the case of Expression (5) below).

$$Fd = Fa \quad (5)$$

Since Expression (6) below is obtained from Expressions (1) to (5) above, the electric field Eth corresponding to the threshold voltage is represented by Expression (7) below, which is obtained by rearranging Expression (6). It can be seen from Expression (7) that the electric field Eth corresponding to the threshold voltage varies in accordance with the charge Q, i.e., the amount of charge, of the electrophoretic particles 32.

$$Q \cdot Eth = Fv + C_1 \cdot Q^2 + C_2 \cdot Q \cdot Qs \quad (6)$$

$$Eth = Fv/Q + C_1 \cdot Q + C_2 \cdot Qs \quad (7)$$

Next, a display sequence for white display and a display sequence for black display will be described. Note that the six potential levels a [V], b [V], c [V], d [V], e [V] and f [V], as well as the ground potential GND (0 V), will be referred to in the following description. The ground potential GND and these six potential levels satisfy the relationship a<b<c<0<d<e<f. When the potential level difference between adjacent electrodes is one (e.g., when the potentials a [V] and b [V] are applied to two adjacent electrodes), a potential gradient corresponding to the electric field intensity E2 (+E2 or −E2) is formed between the electrodes. Similarly, when the potential level difference between adjacent electrodes is two (e.g., when the potentials a [V] and c [V] are applied to two adjacent electrodes), a potential gradient corresponding to the electric field intensity E3 (+E3 or −E3) is formed between the electrodes. When the potential level difference between adjacent electrodes is three (e.g., when the potential a [V] and the ground potential GND are applied to two adjacent electrodes), a potential gradient corresponding to the electric field intensity E4 (+E4 or −E4) is formed between the electrodes.

[White Display (Reset)]

Figure 4:
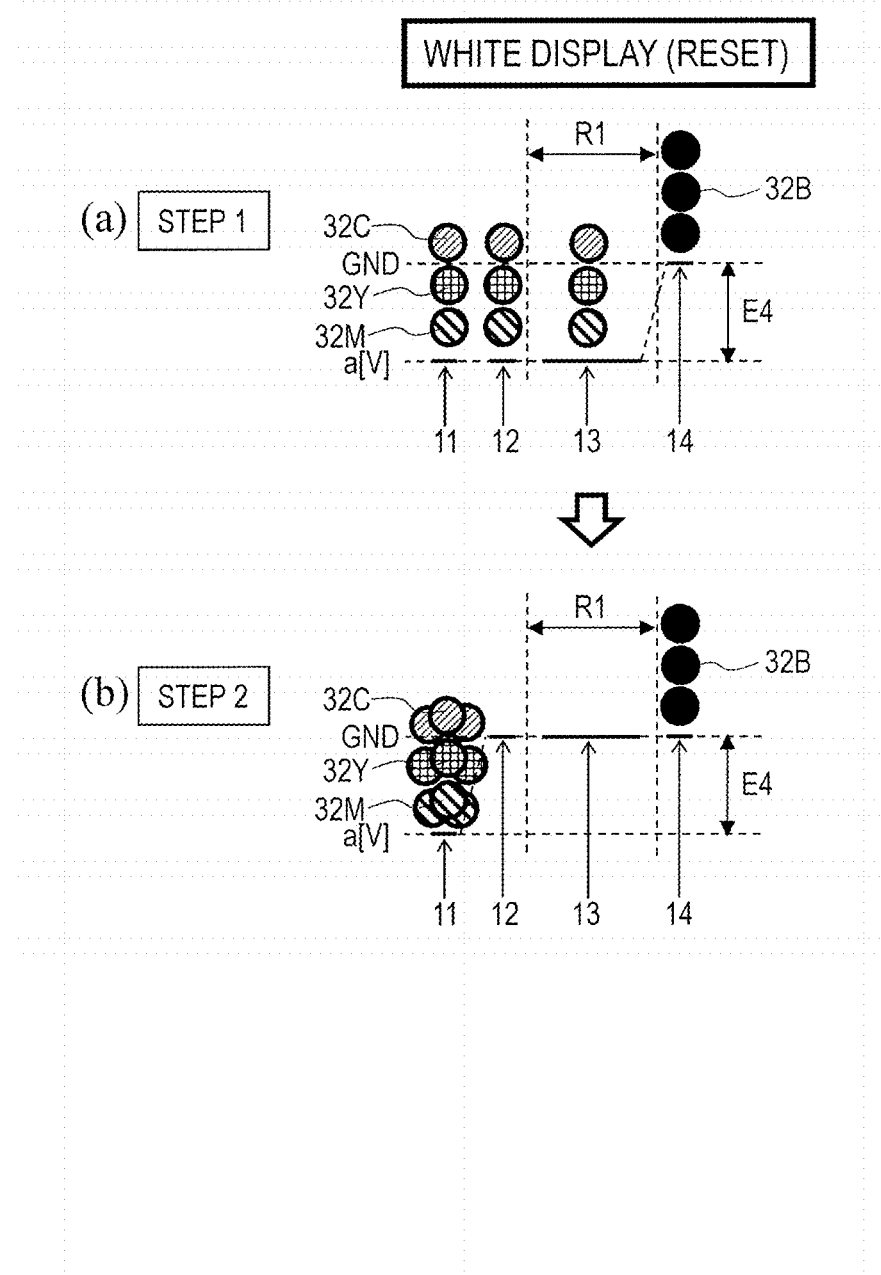
FIGS. 4 (a) and (b) are diagrams illustrating a display sequence for white display.

FIGS. 4(*a*) and 4(*b*) are diagrams illustrating a display sequence for white display. First, as shown in FIG. 4(*a*), the potentials of the first electrode 11, the second electrode 12 and the third electrode 13 are set to a [V], and the potential of the fourth electrode 14 is set to the ground potential GND (step 1). At this point, since a potential gradient corresponding to the electric field intensity E4 is formed between the third electrode 13 and the fourth electrode 14, the cyan particles 32C, the magenta particles 32M and the yellow particles 32Y are positioned over the first electrode 11, the second electrode 12 and the third electrode 13 and the black particles 32B are positioned over the fourth electrode 14.

Then, as shown in FIG. 4(*b*), the potentials of the second electrode 12 and the third electrode 13 are set to the ground potential GND (step 2). At this point, since a potential gradient corresponding to the electric field intensity E4 is formed between the first electrode 11 and the second electrode 12, the cyan particles 32C, the magenta particles 32M and the yellow particles 32Y move from over the second electrode 12 and the third electrode 13 to over the first electrode 11. In this state, since the electrophoretic particles 32 are absent in the opening region R1 (over the third electrode 13), the external light (ambient light) entering the electrophoretic layer 30 from the observer side is reflected by the third electrode 13, thereby producing white display.

With the electrophoretic element 100, switching from one color to another is basically done via this white display state. Therefore, white display can also be said to be a reset operation.

[Black Display]

Figure 5:
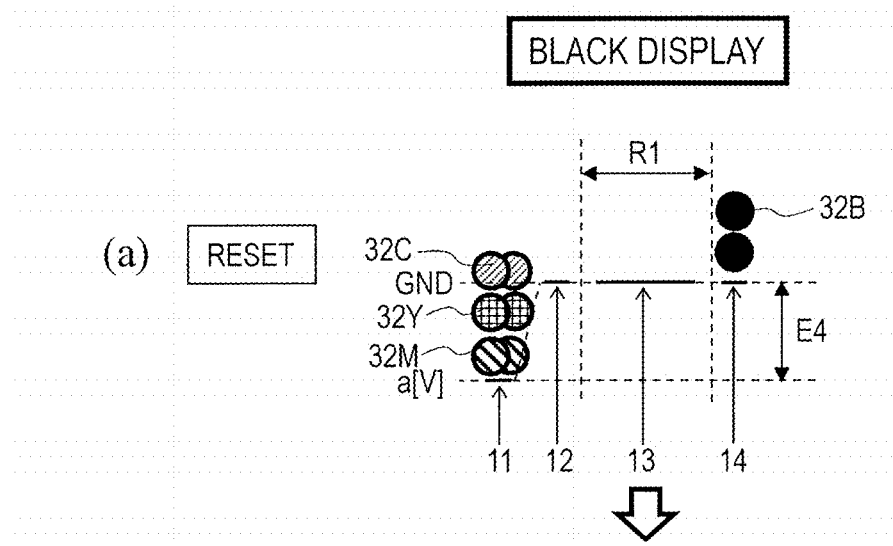
FIGS. 5 (a) and (b) are diagrams illustrating a display sequence for black display.
Figure 5:
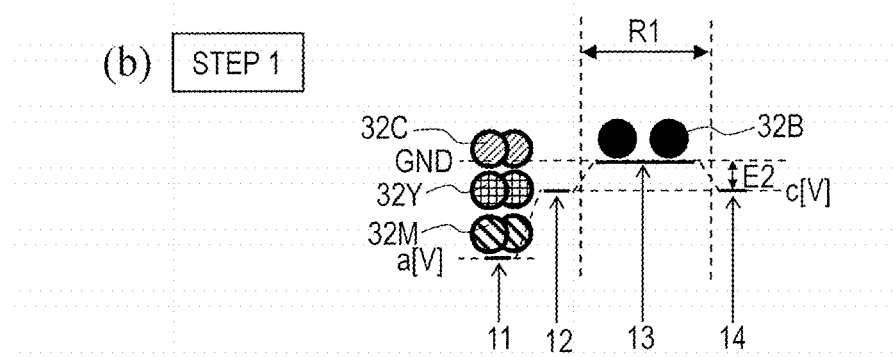

FIGS. 5(*a*) and 5(*b*) are diagrams illustrating a display sequence for black display. First, as shown in FIG. 5(*a*), the same potentials as those in the white display state are applied to the first electrode 11, the second electrode 12, the third electrode 13 and the fourth electrode 14, thus resetting display.

Then, as shown in FIG. 5(*b*), the potentials of the second electrode 12 and the fourth electrode 14 are set to c [V] (step 1). At this point, since a potential gradient corresponding to the electric field intensity E2 is formed between the third electrode 13 and the fourth electrode 14, the black particles 32B move from over the fourth electrode 14 to the opening region R1 (over the third electrode 13). Therefore, in this state, black display is produced. At this point, since a potential gradient corresponding to the electric field intensity E2 is formed between the second electrode 12 and the third electrode 13, the black particles 32 that have moved to the opening region R1 are prevented from further moving over to the second electrode 12.

Next, display sequences for single-color display of cyan, magenta and yellow will be described.

[Cyan Display]

Figure 6:
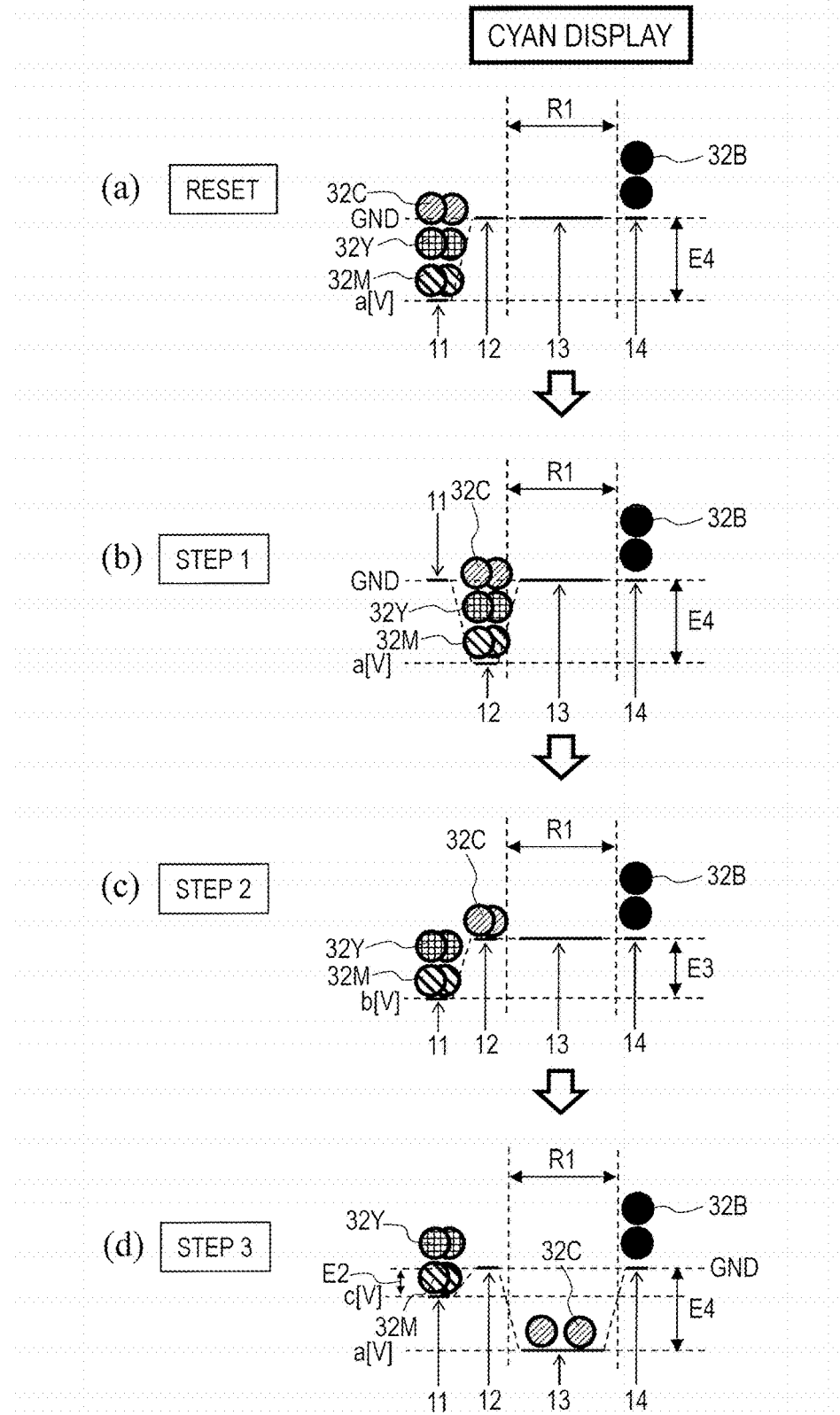
FIG. 6 (a) to (d) are diagrams illustrating a display sequence for cyan display.

FIGS. 6(*a*) to 6(*d*) are diagrams illustrating a display sequence for cyan display. First, as shown in FIG. 6(*a*), the same potentials as those in the white display state are applied to the first electrode 11, the second electrode 12, the third electrode 13 and the fourth electrode 14, thus resetting display.

Next, as shown in FIG. 6(*b*), the potential of the first electrode 11 is set to the ground potential GND, and the potential of the second electrode 12 is set to a [V] (step 1). At this point, a potential gradient corresponding to the electric field intensity E4 is formed between the first electrode 11 and the second electrode 12. Therefore, the cyan particles 32C, the magenta particles 32M and the yellow particles 32Y move from over the first electrode 11 to over the second electrode 12.

Next, as shown in FIG. 6(*c*), the potential of the first electrode 11 is set to b [V], and the potential of the second electrode 12 is set to the ground potential GND (step 2). At this point, since a potential gradient corresponding to the electric field intensity E3 is formed between the first electrode 11 and the second electrode 12, the magenta particles 32M and the yellow particles 32Y move from over the second electrode 11 to over the first electrode 11 (the cyan particles 32C remain over the second electrode 12).

Then, as shown in FIG. 6(d), the potential of the first electrode 11 is set to c [V], and the potential of the third electrode 13 is set to a [V] (step 3). At this point, since a potential gradient corresponding to the electric field intensity E4 is formed between the second electrode 12 and the third electrode 13, the cyan particles 32C move from over the second electrode 12 to the opening region R1 (over the third electrode 13). Therefore, in this state, cyan display is produced.

[Magenta Display]

Figure 7:
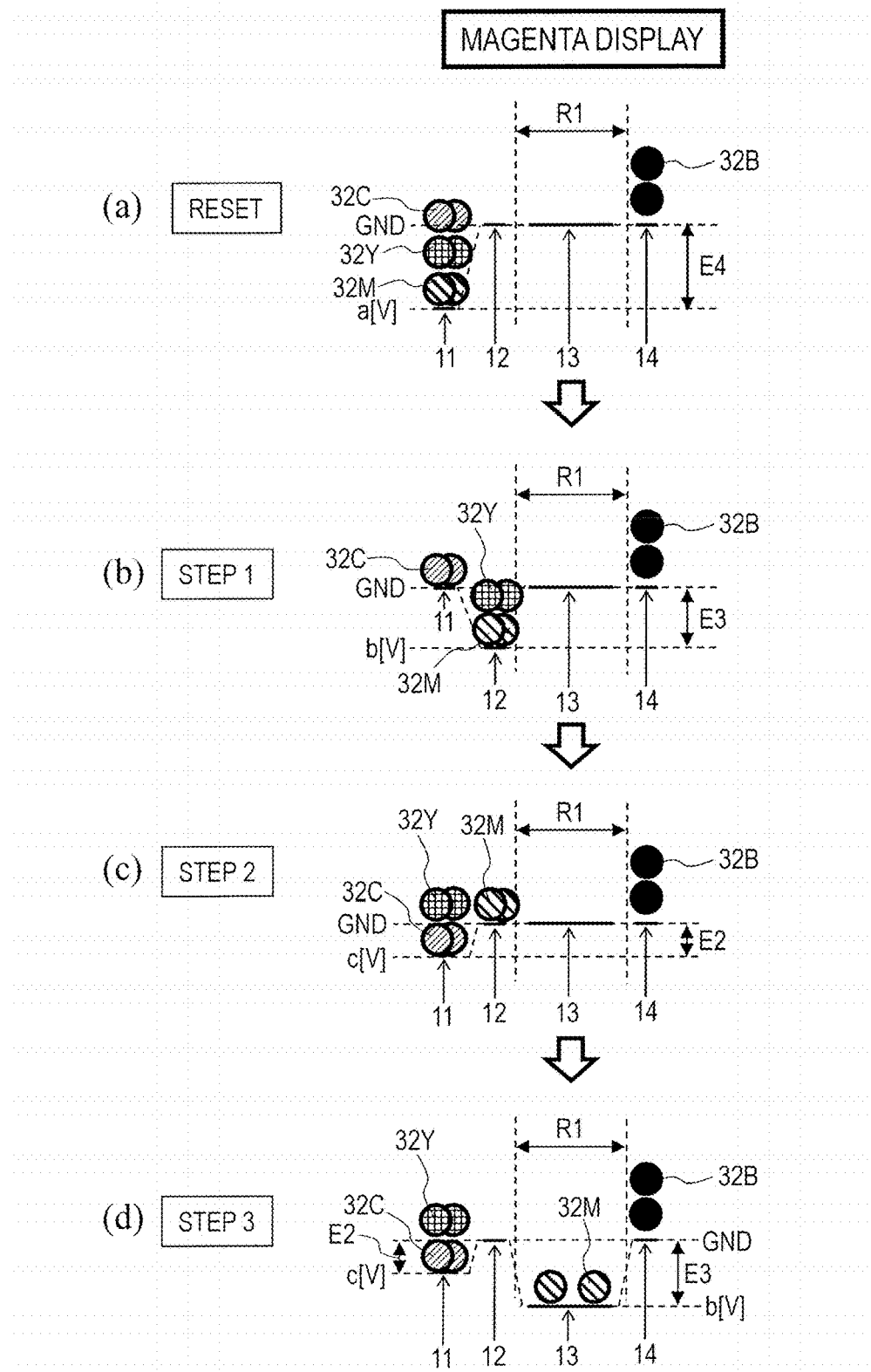
FIG. 7 (a) to (d) are diagrams illustrating a display sequence for magenta display.

FIGS. 7(a) to 7(d) are diagrams illustrating a display sequence for magenta display. First, as shown in FIG. 7(a), the same potentials as those in the white display state are applied to the first electrode 11, the second electrode 12, the third electrode 13 and the fourth electrode 14, thus resetting display.

Next, as shown in FIG. 7(b), the potential of the first electrode 11 is set to the ground potential GND, and the potential of the second electrode 12 is set to b [V] (step 1). At this point, since a potential gradient corresponding to the electric field intensity E3 is formed between the first electrode 11 and the second electrode 12, the magenta particles 32M and the yellow particles 32Y move from over the first electrode 11 to over the second electrode 12 (the cyan particles 32C remain over the first electrode 11).

Next, as shown in FIG. 7(c), the potential of the first electrode 11 is set to c [V], and the potential of the second electrode 12 is set to the ground potential GND (step 2). At this point, since a potential gradient corresponding to the electric field intensity E2 is formed between the first electrode 11 and the second electrode 12, the yellow particles 32Y move from over the second electrode 12 to over the first electrode 11 (the magenta particles 32M remain over the second electrode 12).

Then, as shown in FIG. 7(d), the potential of the third electrode 13 is set to b [V] (step 3). At this point, since a potential gradient corresponding to the electric field intensity E3 is formed between the second electrode 12 and the third electrode 13, the magenta particles 32M move from over the second electrode 12 to the opening region R1 (over the third electrode 13). Therefore, in this state, magenta display is produced.

[Yellow Display]

Figure 8:
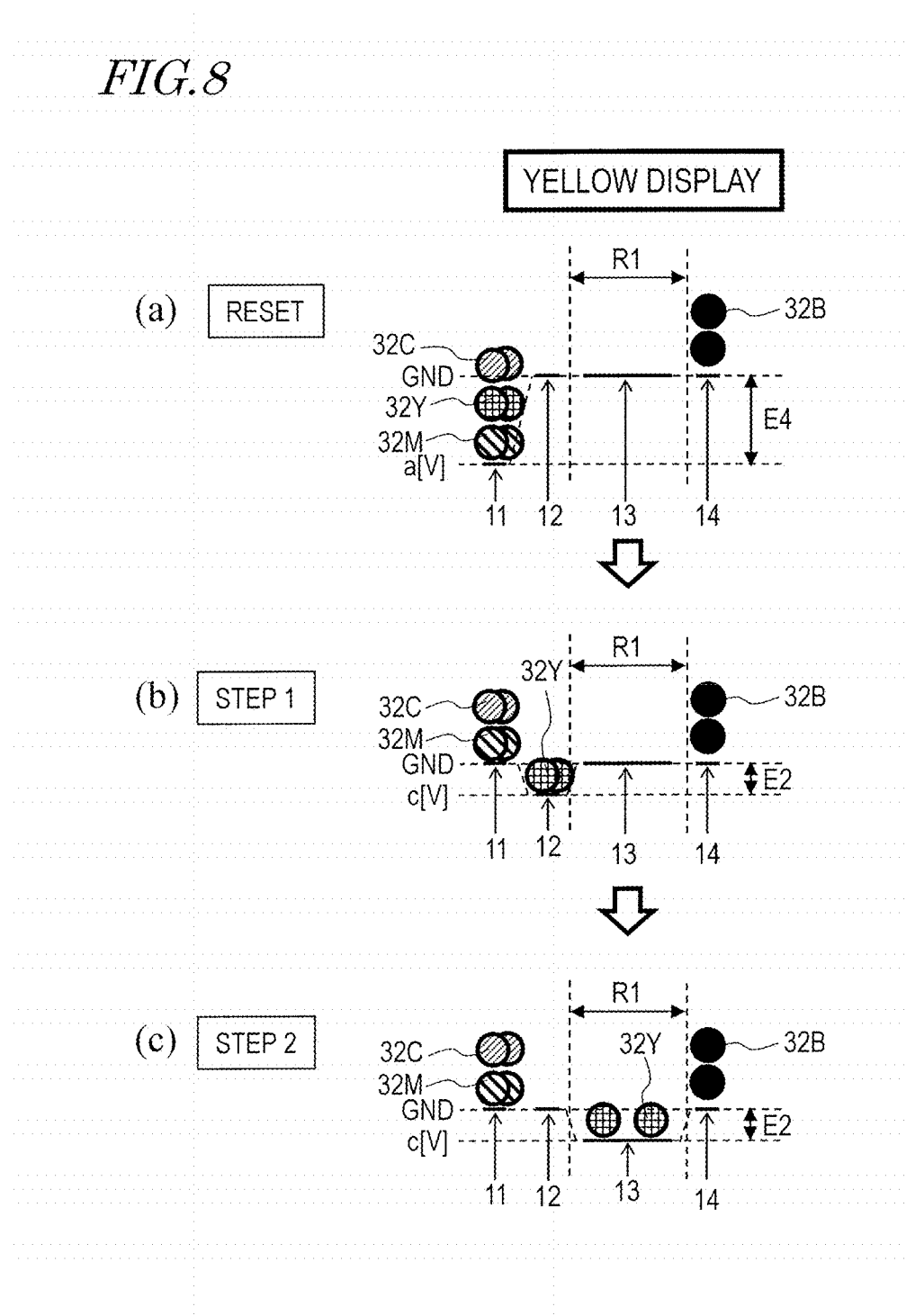
FIG. 8 (a) to (c) are diagrams illustrating a display sequence for yellow display.

FIGS. 8(a) to 8(c) are diagrams illustrating a display sequence for yellow display. First, as shown in FIG. 8(a), the same potentials as those in the white display state are applied to the first electrode 11, the second electrode 12, the third electrode 13 and the fourth electrode 14, thus resetting display.

Next, as shown in FIG. 8(b), the potential of the first electrode 11 is set to the ground potential GND, and the potential of the second electrode 12 is set to c [V] (step 1). At this point, since a potential gradient corresponding to the electric field intensity E2 is formed between the first electrode 11 and the second electrode 12, the yellow particles 32Y move from over the first electrode 11 to over the second electrode 12 (the cyan particles 32C and the magenta particles 32M remain over the first electrode 11).

Then, as shown in FIG. 8(c), the potential of the second electrode 12 is set to the ground potential GND, and the potential of the third electrode 13 is set to c [V] (step 2). At this point, since a potential gradient corresponding to the electric field intensity E2 is formed between the second electrode 12 and the third electrode 13, the yellow particles 32Y move from over the second electrode 12 to the opening region R1 (over the third electrode 13). Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 9:
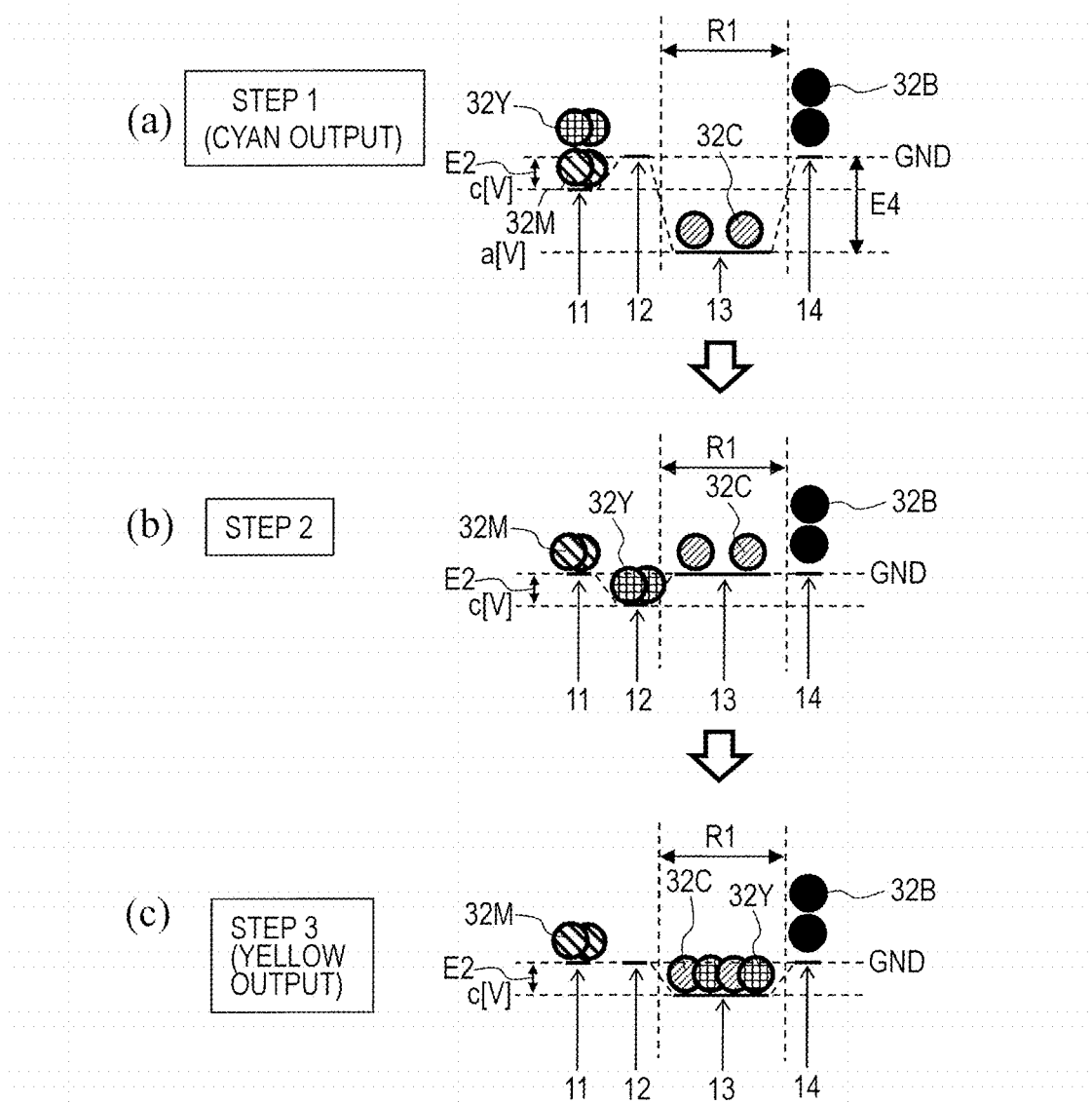
FIG. 9 (a) to (c) are diagrams illustrating a display sequence for green display.

FIGS. 9(a) to 9(c) are diagrams illustrating a display sequence for green display (i.e., mixed color display between cyan and yellow). First, as shown in FIG. 9(a), the cyan particles 32C are moved to the opening region R1 (over the third electrode 13), as in the display sequence for cyan display (step 1: cyan output).

Next, as shown in FIG. 9(b), the potentials of the first electrode 11 and the third electrode 13 are set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32Y move from over the first electrode 11 to over the second electrode 12 (the magenta particles 32M remain over the first electrode 11).

Then, as shown in FIG. 9(c), the potential of the second electrode 12 is set to the ground potential GND, and the potential of the third electrode 13 is set to c [V] (step 3). At this point, since a potential gradient corresponding to the electric field intensity E2 is formed between the second electrode 12 and the third electrode 13, the yellow particles 32Y move from over the second electrode 12 to the opening region R1 (over the third electrode 13) (yellow output). Therefore, in this state, green display is produced by subtractive color mixing between cyan and yellow.

[Blue Display]

Figure 10:
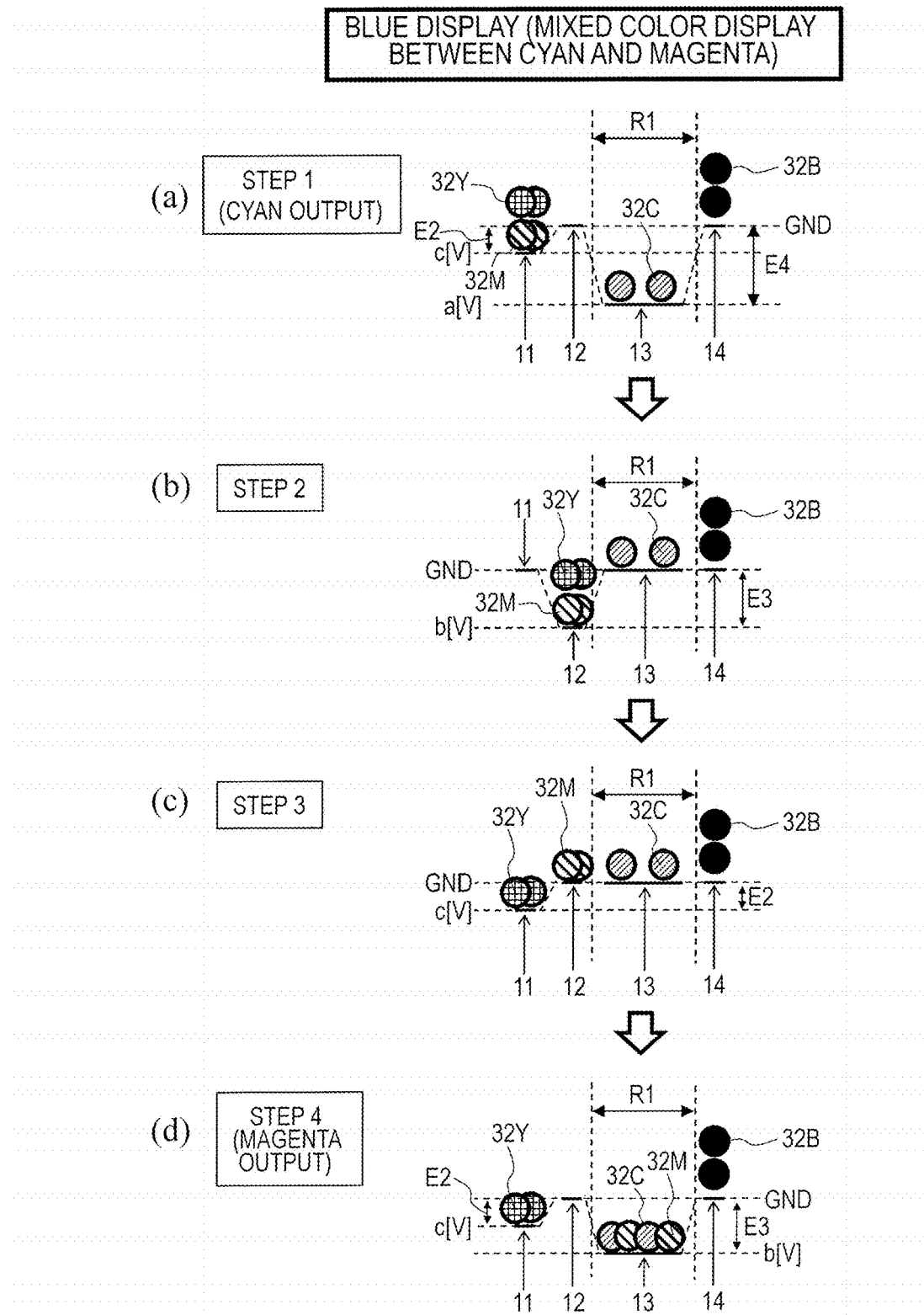
FIG. 10 (a) to (d) are diagrams illustrating a display sequence for blue display.

FIGS. 10(a) to 10(d) are diagrams illustrating a display sequence for blue display (i.e., mixed color display between cyan and magenta). First, as shown in FIG. 10(a), the cyan particles 32C are moved to the opening region R1 (over the third electrode 13), as in the display sequence for cyan display (step 1: cyan output).

Next, as shown in FIG. 10(b), the potentials of the first electrode 11 and the third electrode 13 are set to the ground potential GND, and the potential of the second electrode 12 is set to b [V] (step 2). At this point, since a potential gradient corresponding to the electric field intensity E3 is formed between the first electrode 11 and the second electrode 12, the magenta particles 32M and the yellow particles 32Y move from over the first electrode 11 to over the second electrode 12.

Next, as shown in FIG. 10(c), the potential of the first electrode 11 is set to c [V], and the potential of the second electrode 12 is set to the ground potential GND (step 3). At this point, since a potential gradient corresponding to the electric field intensity E2 is formed between the first electrode 11 and the second electrode 12, the yellow particles 32Y move from over the second electrode 12 to over the first electrode 11 (the magenta particles 32M remain over the second electrode 12).

Then, as shown in FIG. 10(d), the potential of the third electrode 13 is set to b [V] (step 4). At this point, since a potential gradient corresponding to the electric field intensity E3 is formed between the second electrode 12 and the third electrode 13, the magenta particles 32M move from over the second electrode 12 to the opening region R1 (over the third electrode 13) (magenta output). Therefore, in this state, blue display is produced by subtractive color mixing between cyan and magenta.

[Red Display]

FIGS. 11(a) to 11(c) are diagrams illustrating a display sequence for red display (i.e., mixed color display between magenta and yellow). First, as shown in FIG. 11(a), the magenta particles 32M are moved to the opening region R1, as in the display sequence for magenta display (step 1: magenta output).

Next, as shown in FIG. 11(b), the potentials of the first electrode 11 and the third electrode 13 are set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32Y move from over the first electrode 11 to over the second electrode 12 (the cyan particles 32C remain over the first electrode 11).

Then, as shown in FIG. 11(c), the potential of the second electrode 12 is set to the ground potential GND, and the potential of the third electrode 13 is set to c [V] (step 4). At this point, since a potential gradient corresponding to the electric field intensity E2 is formed between the second electrode 12 and the third electrode 13, the yellow particles 32Y move from over the second electrode 12 to the opening region R1 (over the third electrode 13) (yellow output). Therefore, in this state, red display is produced by subtractive color mixing between magenta and yellow.

[Gray Level Display]

Herein, a display sequence for gray level display will be described using magenta and red as an example.

Figure 12:
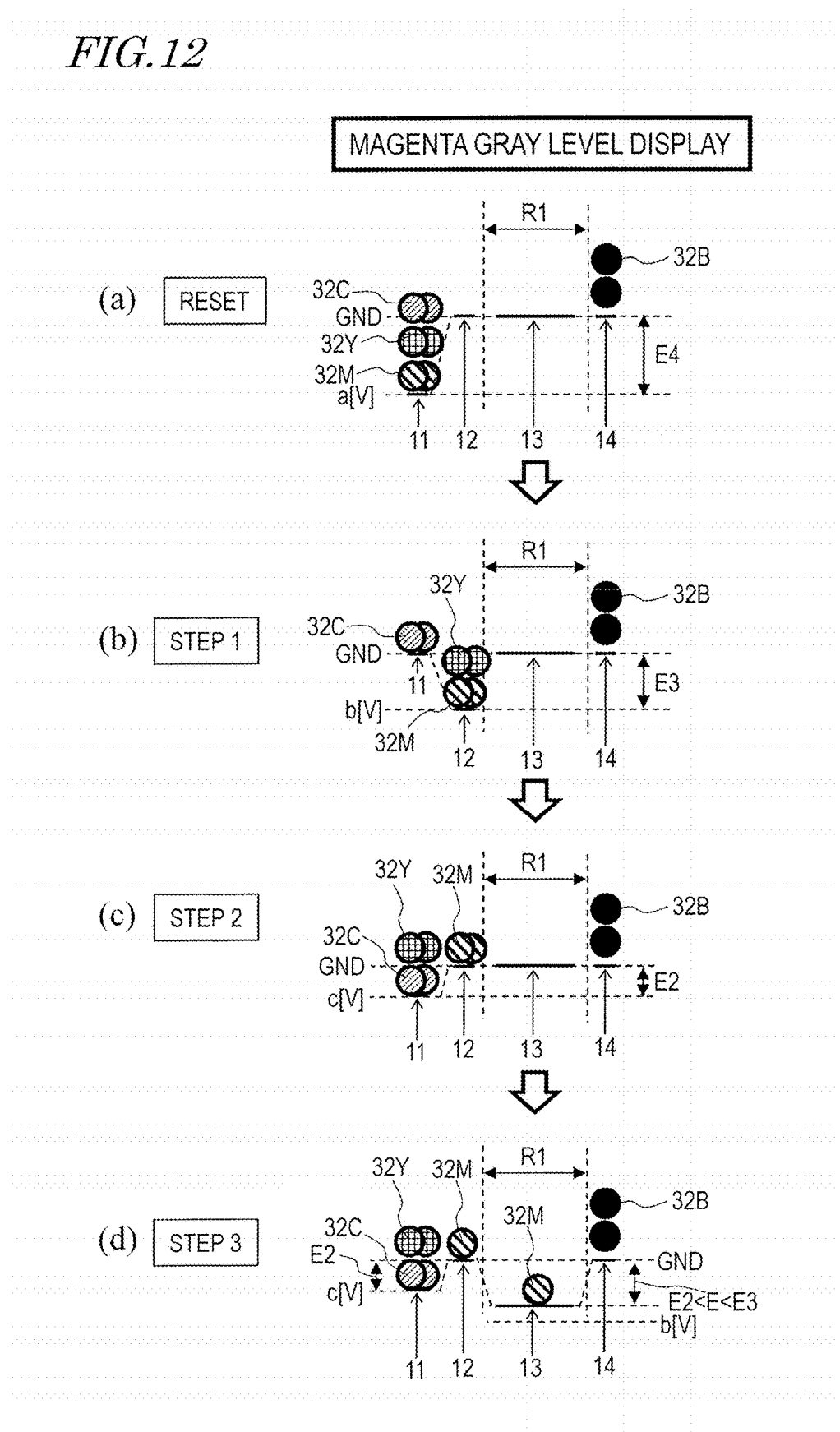
FIG. 12 (a) to (d) are diagrams illustrating a display sequence for magenta gray level display.

FIGS. 12(a) to 12(d) are diagrams illustrating a display sequence for gray level display of magenta. First, as shown in FIG. 12(a), the same potentials as those in the white display state are applied to the first electrode 11, the second electrode 12, the third electrode 13 and the fourth electrode 14, thus resetting display.

Next, as shown in FIG. 12(b), the potential of the first electrode 11 is set to the ground potential GND, and the potential of the second electrode 12 is set to b [V] (step 1). At this point, since a potential gradient corresponding to the electric field intensity E3 is formed between the first electrode 11 and the second electrode 12, the magenta particles 32M and the yellow particles 32Y move from over the first electrode 11 to over the second electrode 12 (the cyan particles 32C remain over the first electrode 11).

Next, as shown in FIG. 12(c), the potential of the first electrode 11 is set to c [V], and the potential of the second electrode 12 is set to the ground potential GND (step 2). At this point, since a potential gradient corresponding to the electric field intensity E2 is formed between the first electrode 11 and the second electrode 12, the yellow particles 32Y move from over the second electrode 12 to over the first electrode 11 (the magenta particles 32M remain over the second electrode 12).

Then, as shown in FIG. 12(d), the potential of the third electrode 13 is set to be higher than b [V] and lower than c [V] (step 3). At this point, since a potential gradient corresponding to the electric field intensity E higher than the electric field intensity E2 and lower than the electric field intensity E3 (E that satisfies the relationship E2<E<E3) is formed between the second electrode 12 and the third electrode 13, some of the magenta particles 32M (an intended amount of magenta particles 32M) move from over the second electrode 12 to the opening region R1 (over the third electrode 13). Thus, magenta gray level display can be produced.

Figure 13:
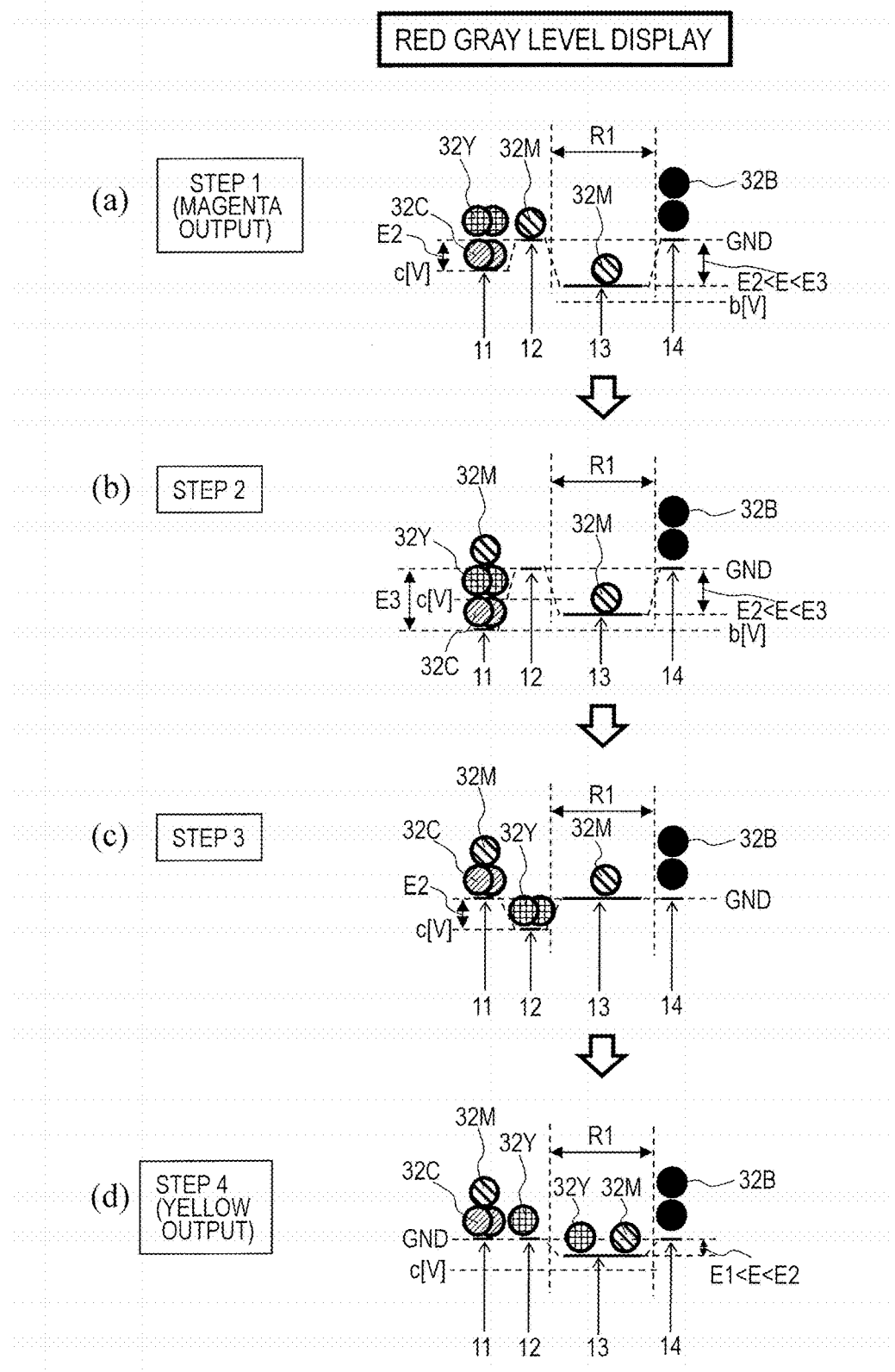
FIG. 13 (a) to (d) are diagrams illustrating a display sequence for red gray level display.

FIGS. 13(a) to 13(d) are diagrams illustrating a display sequence for gray level display of red. First, as shown in FIG. 13(a), some of the magenta particles 32M are moved to the opening region R1, as in the display sequence for magenta gray level display (step 1: magenta output).

Next, as shown in FIG. 13(b), the potential of the first electrode 11 is set to b [V] (step 2). At this point, since a potential gradient corresponding to the electric field intensity E3 is formed between the first electrode 11 and the second electrode 12, magenta particles 32M that have remained over the second electrode 12 move to over the first electrode 11.

Next, as shown in FIG. 13(c), the potentials of the first electrode 11 and the third electrode 13 are set to the ground potential GND, and the potential of the second electrode 12 is set to c [V] (step 3). At this point, since a potential gradient corresponding to the electric field intensity E2 is formed between the first electrode 11 and the second electrode 12, the yellow particles 32Y move from over the first electrode 11 to over the second electrode 12 (the cyan particles 32C and the magenta particles 32M that are over the first electrode 11 remain there).

Then, as shown in FIG. 13(d), the potential of the second electrode 12 is set to the ground potential GND, and the potential of the third electrode 13 is set to be higher than c [V] and lower than the ground potential GND (step 4). At this point, since a potential gradient corresponding to the electric field intensity E lower than the electric field intensity E2 and higher than the electric field intensity E1 (E that satisfies the relationship E1<E<E2) is formed between the second electrode 12 and the third electrode 13, some of the yellow particles 32Y (an intended amount of yellow particles 32Y) move from over the second electrode 12 to the opening region R1 (over the third electrode 13). Thus, read gray level display can be produced.

As described above, with the electrophoretic element 100 of the present embodiment, by controlling the potentials of the plurality of electrodes 11, 12, 13 and 14 of the first substrate 10, it is possible to locate any one or more of the plurality of types of electrophoretic particles 32 in the opening region R1. Therefore, it is possible to produce display in which only one type of electrophoretic particles 32 is positioned in the opening region R1 (herein, black display, cyan display, magenta display and yellow display), and it is possible to produce display in which none of the types of electrophoretic particles 32 is positioned in the opening region R1 (herein, white display). Moreover, with the electrophoretic element 100 of the present embodiment, it is also possible to produce display in which two or more of the plurality of types of electrophoretic particles 32 are positioned in the opening region R1 (e.g., green display, blue display and red display illustrated above). Thus, it is possible to realize subtractive color mixing (superposition of colors) within a pixel Px, rather than juxtapositional color mixing (i.e., mixing or colors between pixels Px).

As already described above, the electrophoretic element 100 of the present embodiment is capable of moving the types of electrophoretic particles 32, each in an intended amount, to the opening region R1. That is, the migration of electrophoretic particles 32 to the opening region R1 can be controlled independently for each type, thus preventing crosstalk. Therefore, the number of gray levels can be increased significantly from those of conventional techniques, and it is possible to realize a fine gray level representation. Note that such an advantageous effect is realized in the present embodiment because a transverse electric field generated by three or more electrodes (herein, the four electrodes 11, 12, 13 and 14) arranged in the horizontal direction (along a certain direction that is parallel to the substrate surface) is utilized, and electrophoretic particles that are charged with the same polarity and have different threshold characteristics (herein, the cyan particles 32C, the magenta particles 32M and the yellow particles 32Y) are used. By using three or more electrodes arranged in the horizontal direction, it is possible to generate transverse electric fields independently in a plurality of regions within a pixel, and by using two or more types of electrophoretic particles that are charged with the same polarity and have different threshold characteristics, it is possible to selectively move one type of electrophoretic particles by causing an electric field of an appropriate intensity to act thereon.

In the display sequence illustrated above, when moving any of the cyan particles 32C, the magenta particles 32M and the yellow particles 32Y to the opening region R1, only the subject electrophoretic particles 32 are positioned over the second electrode 12 and then moved to the opening region R1. Since the electrophoretic particles 32 to be moved to the opening region R1 are once separated over an electrode (the second electrode 12) that is adjacent to the third electrode 13, as described above, it is possible to more reliably prevent crosstalk.

The amount of output of electrophoretic particles 32 of a certain color (i.e., a certain type) to the opening region R1 can be controlled by adjusting the intensity of the electric field applied to the electrophoretic layer 30 in the opening region R1 and/or the length of time (output time) over which the electric field is applied to the electrophoretic layer 30 in the opening region R1. The intensity of the electric field applied to the electrophoretic layer 30 in the opening region R1 is determined by the level of the applied voltage to the third electrode 13 (the potential difference between the third electrode 13 and an electrode adjacent thereto). The length of output time can be determined by the number of subframes over which the electrophoretic particles 32 are output, as described below, for example.

Note that although the present embodiment illustrates a case in which the electrophoretic layer 30 includes four types of electrophoretic particles 32, the number of types of electrophoretic particles 32 is not limited to four. It is only required that the electrophoretic layer 30 includes at least two types of electrophoretic particles that are charged with the same polarity and have different threshold characteristics from each other.

When the plurality of types of electrophoretic particles 32 include another type of electrophoretic particles that are charged with a different polarity from the two or more types of electrophoretic particles that are charged with the same polarity and have different threshold characteristics from each other, as in the present embodiment, the number of control parameters for the electrophoretic particles 32 increases, and it is therefore possible to provide a large margin for crosstalk occurring between the plurality of types of electrophoretic particles 32 that are threshold-controlled.

Although the present embodiment illustrates a case in which the first substrate 10 includes four (four types of) electrodes 11, 12, 13 and 14 in each pixel Px, the first substrate 10 may include three (three types of) electrodes in each pixel Px as in Embodiment 2 to be described below, or the first substrate 10 may include five (five types of) electrodes (or six or more (six or more types of) electrodes) in each pixel Px. When the electrophoretic layer 30 includes four types of electrophoretic particles 32, as in the present embodiment, it is preferred that the first substrate 10 includes four (four types of) or more electrodes in each pixel Px.

[Specific Configuration Example for Active Matrix Driving]

The electrophoretic element (display device) 100 of the present embodiment is typically driven by active matrix addressing. A specific configuration example of the active matrix-type display device 100 will now be described.

Figure 14:
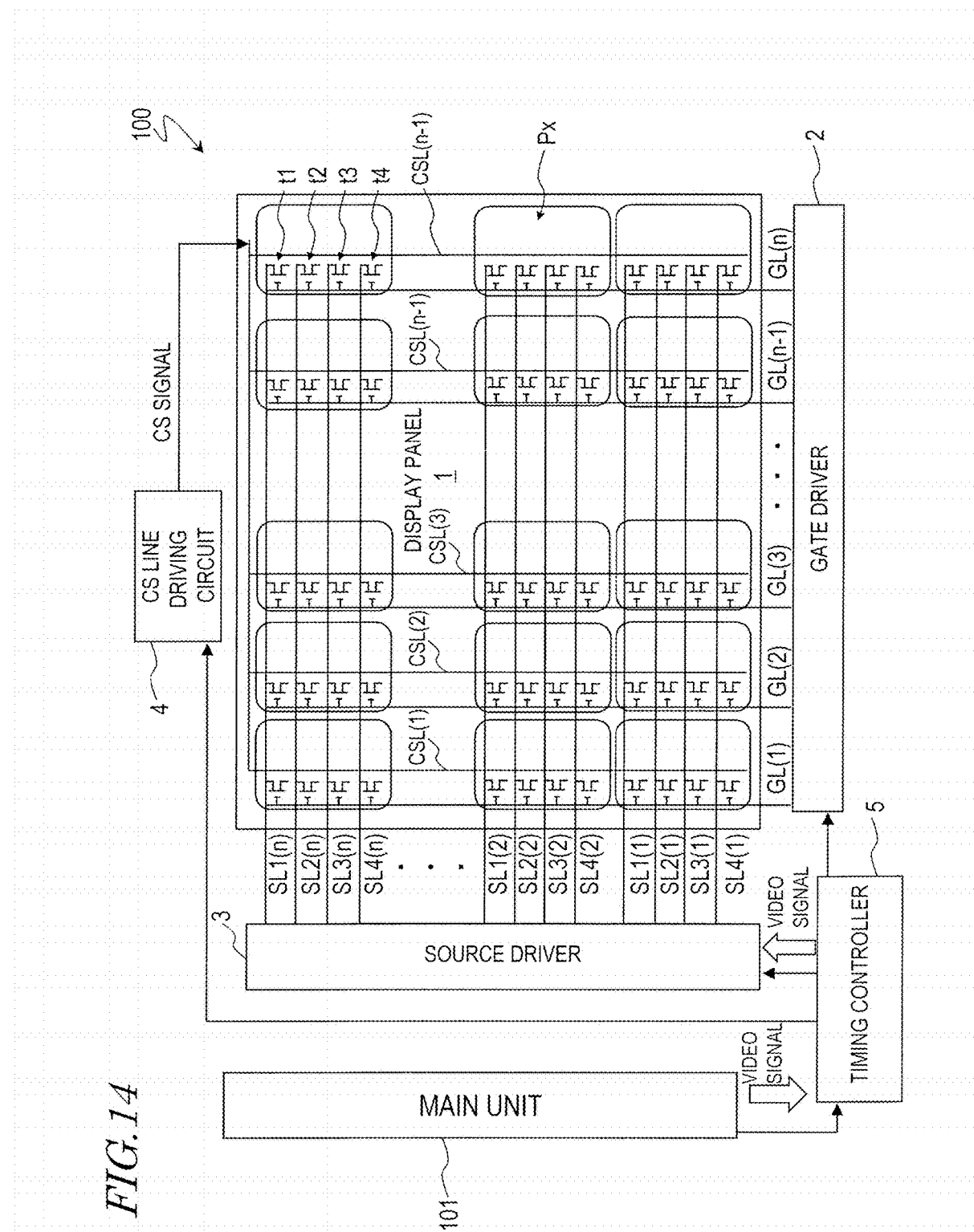
FIG. 14 A diagram schematically showing an active matrix-type electrophoretic element (display device) 100.

FIG. 14 shows a specific configuration example of the display device 100. In the example shown in FIG. 14, the display device 100 includes a main unit 101, a display panel 1, a gate driver (scanning line driving circuit) 2 and a source driver (signal line driving circuit) 3. The display device 100 also includes a storage capacitor line driving circuit (CS line driving circuit) 4 and a timing controller 5.

Figure 11:
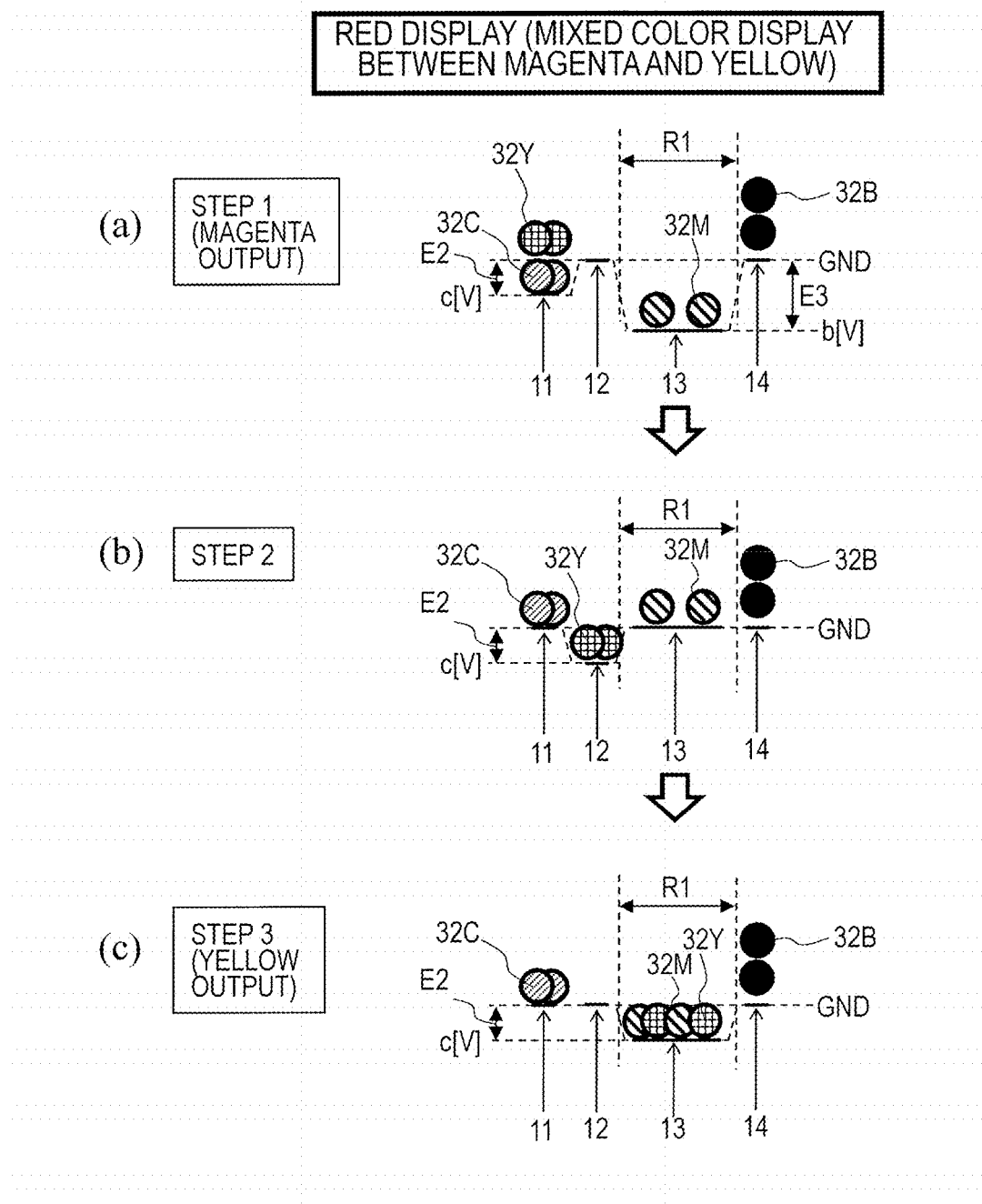
FIG. 11 (a) to (c) are diagrams illustrating a display sequence for red display.

The display panel 1 includes four thin film transistors (TFTs) t1, t2, t3 and t4 provided in each pixel Px. The display panel 1 also includes a gate line (scanning line) GL provided for each pixel row, four source lines (signal lines) SL1, SL2, SL3 and SL4 provided for each pixel column, and a storage capacitor line (CS line) CSL provided for each pixel row. In FIG. 11, a gate line GL corresponding to the $n^{th}$ pixel row is denoted as GL(n), and the source lines SL1, SL2, SL3 and SL4 corresponding to the $n^{th}$ pixel column are denoted as SL1(n), SL2(n), SL3(n) and SL4(n). A CS line CSL corresponding to the $n^{th}$ pixel row is denoted as CSL(n).

The gate driver 2 supplies scanning signal voltages to the gate lines GL. The source driver 3 calculates the value of the voltage to be output to each pixel Px based on a video signal that is received from the main unit 101 via the timing controller 5, and supplies a display signal voltage of the calculated value to the source lines SL1, SL2, SL3 and SL4.

The CS line driving circuit 4 outputs CS signals to the CS lines CSL based on signals received from the timing controller 5.

Based on the clock signal, the horizontal sync signal and the vertical sync signal received from the main unit 101, the timing controller 5 outputs, to the gate driver 2 and the source driver 3, a signal that serves as a reference for the gate driver 2 and the source driver 3 to operate in sync with each other. Specifically, based on the vertical sync signal, the timing controller 5 outputs a gate start pulse signal, a gate clock signal and a gate output enable signal to the gate driver 2. Based on the horizontal sync signal, the timing controller 5 outputs a source start pulse signal, a source latch strobe signal and a source clock signal to the source driver 3.

The gate driver 2 starts scanning the display panel 1 using the gate start pulse signal received from the timing controller 5 as a trigger, and applies the ON voltage successively to the gate lines GL based on the gate clock signal, which is a signal used for shifting the selection state of the gate lines GL. Based on the source start pulse signal received from the timing controller 5, the source driver 3 stores received image data of each pixel in the register in accordance with the source clock signal. Then, after storing the image data, the source driver 3 writes the image data on the source lines SL1, SL2, SL3 and SL4 of the display panel 1 in accordance with the next source latch strobe signal. An analog amplifier of the source driver 3, for example, is used for writing the image data.

The main unit 101 transmits the video signal and the video sync signal to the timing controller 5 in order to control the display on the display panel 1.

Figure 15:
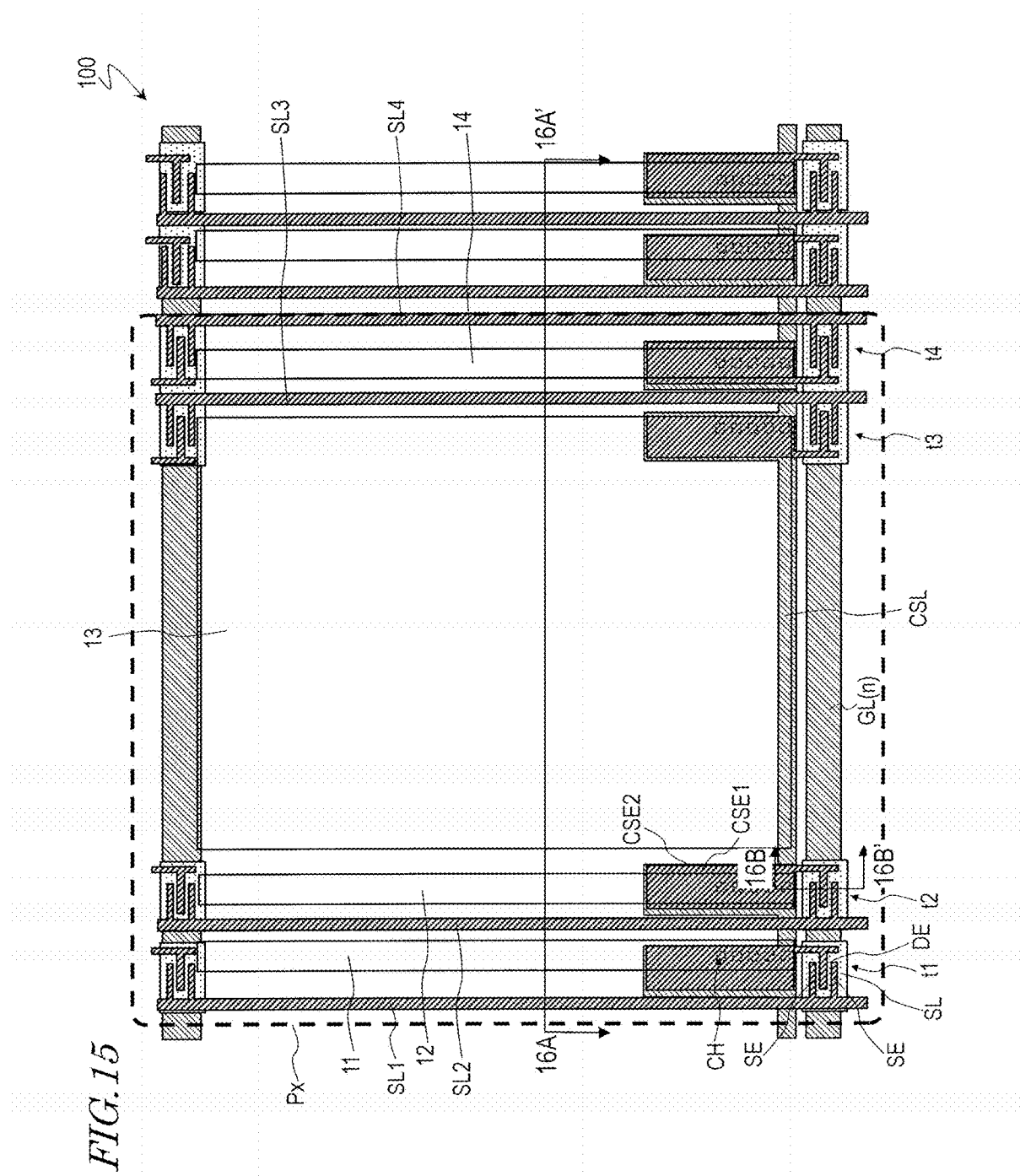
FIG. 15 A plan view schematically showing the active matrix-type electrophoretic element 100.
Figure 16:
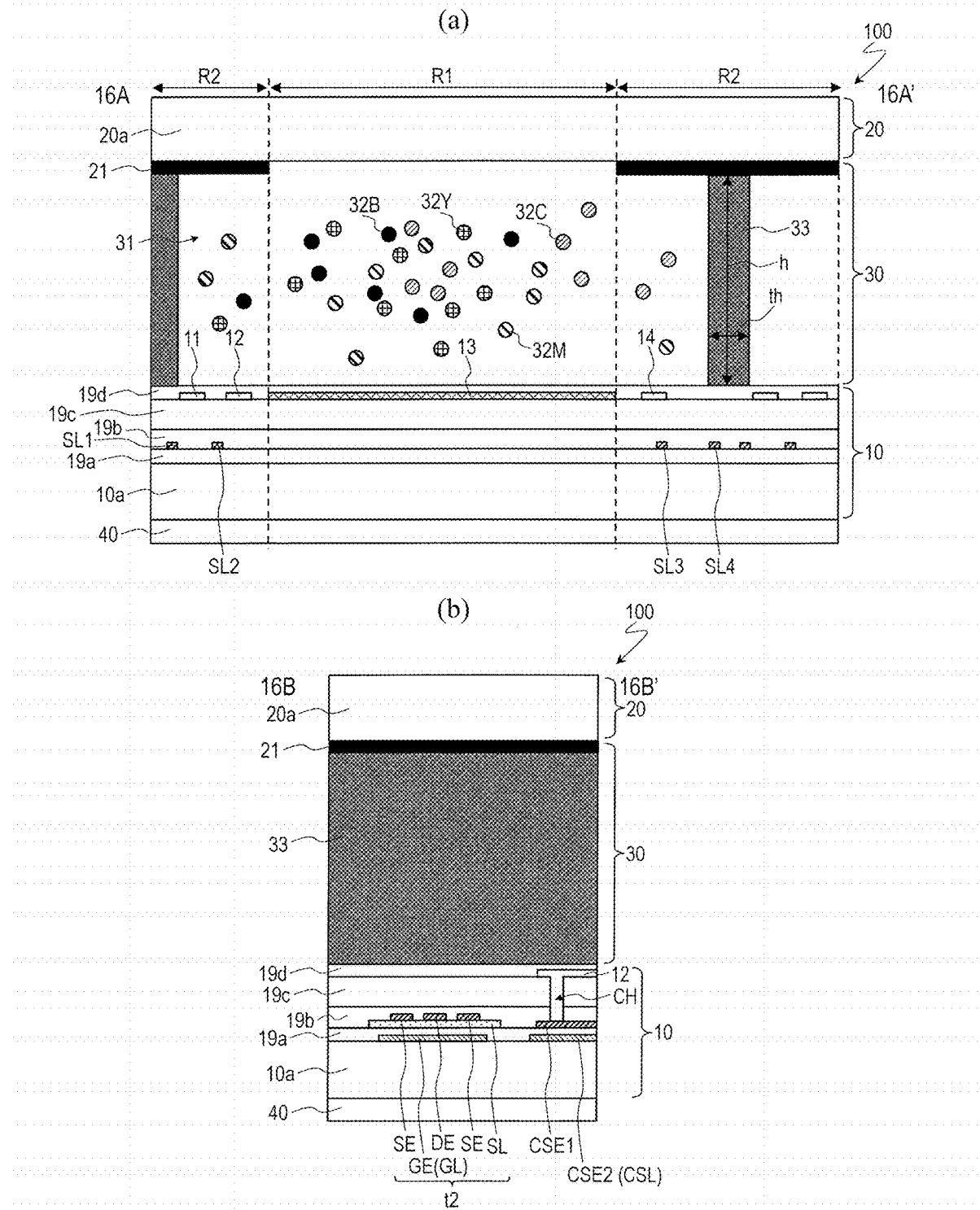
FIGS. 16 (a) and (b) are cross-sectional views schematically showing the active matrix-type electrophoretic element 100, taken along line 16A-16A' and 16B-16B', respectively, of FIG. 15.

Next, referring to FIG. 15, FIGS. 16(a) and 16(b), a more specific configuration example of the display device 100 will be described. FIG. 15 is a plan view schematically showing the display device 100. FIGS. 16(*a*) and 16(*b*) are cross-sectional views taken along line 16A-16A' and 16B-16B', respectively, of FIG. 15.

As shown in FIG. 15, four TFTs (specifically, a first TFT t1, a second TFT t2, a third TFT t3 and a fourth TFT t4) are provided in each pixel Px. The first TFT t1, the second TFT t2, the third TFT t3 and the fourth TFT t4 each include a gate electrode GE, a source electrode SE, a drain electrode DE and a semiconductor layer SL, as shown in FIG. 15 and FIG. 16(*b*).

The gate electrodes GE of the first TFT t1, the second TFT t2, the third TFT t3 and the fourth TFT t4 are electrically connected to a common gate line GL. The source electrodes SE of the first TFT t1, the second TFT t2, the third TFT t3 and the fourth TFT t4 are electrically connected to the first source line SL1, the second source line SL2, the third source line SL3 and the fourth source line SL4, respectively. The drain electrodes DE of the first TFT t1, the second TFT t2, the third TFT t3 and the fourth TFT t4 are electrically connected to the first electrode 11, the second electrode 12, the third electrode 13 and the fourth electrode 14, respectively.

A storage capacitor electrode (CS electrode) CSE1 extended from the drain electrode DE, a storage capacitor counter electrode (CS counter electrode) CSE2 extended from the CS line CSL, and an insulating layer (the gate insulating layer to be described below) 19*a* located therebetween together form a storage capacitor.

The gate line GL, the gate electrode GE, the CS line CSL and the CS counter electrode CSE2 are formed on a surface of the transparent substrate (e.g., a glass substrate) 10*a* of the first substrate 10 that is on the electrophoretic layer 30 side. The gate line GL, the gate electrode GE, the CS line CSL and the CS counter electrode CSE2 can be formed by patterning the same metal film. A gate insulating layer (first insulating layer) 19*a* is formed so as to cover the gate line GL, the gate electrode GE, etc.

An island-shaped semiconductor layer SL is formed on a gate insulating layer 19*a*. The material of the semiconductor layer SL may be any of various known semiconductor materials, e.g., amorphous silicon, polycrystalline silicon, continuous grain silicon (CGS), etc.

The semiconductor layer SL may be an oxide semiconductor layer formed from an oxide semiconductor. The oxide semiconductor layer includes an In—Ga—Zn—O-based semiconductor, for example. Herein, the In—Ga—Zn—O-based semiconductor is a ternary oxide of In (indium), Ga (gallium) and Zn (zinc), wherein there is no particular limitation on the ratio (composition ratio) between In, Ga and Zn, and it may be In:Ga:Zn=2:2:1, In:Ga:Zn=1:1:1, In:Ga:Zn=1:1:2, or the like, for example. The In—Ga—Zn—O-based semiconductor may be amorphous or crystalline. For a crystalline In—Ga—Zn—O-based semiconductor, it is preferred that the c axis is oriented generally perpendicular to the layer surface. The crystal structure of such an In—Ga—Zn—O-based semiconductor is disclosed in Japanese Laid-Open Patent Publication No. 2012-134475, for example. The entire disclosure of Japanese Laid-Open Patent Publication No. 2012-134475 is incorporated herein by reference. A TFT having an In—Ga—Zn—O-based semiconductor layer has a high mobility (20 times or more that of an a-Si TFT) and a low leak current (less than $1/100$ that of an a-Si TFT). Therefore, when an oxide semiconductor layer formed from an In—Ga—Zn—O-based semiconductor is used as the semiconductor layer, there is little OFF leak, and it is therefore possible to further reduce the power consumption.

Note that the oxide semiconductor layer is not limited to an In—Ga—Zn—O-based semiconductor layer. The oxide semiconductor layer may include a Zn—O-based semiconductor (ZnO), an In—Zn—O-based semiconductor (IZO), a Zn—Ti—O-based semiconductor (ZTO), a Cd—Ge—O-based semiconductor, a Cd—Pb—O-based semiconductor, an In—Sn—Zn—O-based semiconductor (e.g., $In_2O_3$—$SnO_2$—ZnO), an In—Ga—Sn—O-based semiconductor, etc., for example.

The source electrode SE and the drain electrode DE are formed so as to be laid on the semiconductor layer SL. The source lines SL1, SL2, SL3 and SL4 and the CS electrode CSE1 are also formed on the gate insulating layer 19*a*. The source electrode SE, the drain electrode DE, the source lines SL1, SL2, SL3 and SL4 and the CS electrode CSE1 can be formed by patterning the same metal film. an interlayer insulating layer (second insulating layer) 19*b* is formed so as to cover the source electrode SE, the drain electrode DE, etc.

A flattening layer (third insulating layer) 19*c* is formed on the interlayer insulating layer 19*b*. The material of the flattening layer 19*c* is a photosensitive acrylic resin, for example.

The first electrode 11, the second electrode 12, the third electrode 13 and the fourth electrode 14 are formed on the flattening layer 19*c*. The third electrode 13, which is a reflective electrode, includes a layer that is formed from a metal material having a high reflectance (e.g., aluminum). The third electrode 13 may have a multi-layer structure including a plurality of layers formed from different conductive materials. For example, the third electrode 13 has a multi-layer structure including a titanium layer, an aluminum layer and an ITO layer layered in this order from the transparent substrate 10*a*. The ITO layer in this configuration serves to prevent corrosion of the aluminum layer.

With the third electrode 13 being a reflective electrode, it is possible to place lines, TFTs, storage capacitors, etc., under the reflective electrode (functioning as a light-reflecting layer), thereby improving the reflective aperture ratio. The third electrode 13 may be a specular reflection electrode that specularly reflects light or a diffuse reflection electrode that diffusively reflects light. When a specular reflection electrode is used as the third electrode 13, it is preferred that a light diffusion layer (e.g., a light-diffusing film) that diffuses light is provided on the front side relative to the electrophoretic layer 30. When a diffuse reflection electrode is used as the third electrode 13, an uneven shape can be formed on the surface of an insulating layer 19*c* located directly below the third electrode 13, thereby giving an uneven shape to the surface of the third electrode 13 (reflecting the uneven shape of the surface of the insulating layer 19*c*) so that the third electrode 13 functions as a diffuse reflection electrode.

Note that the first electrode 11, the second electrode 12 and the fourth electrode 14 may each be a reflective electrode having the same configuration as the third electrode 13 or a transparent electrode formed from a transparent conductive material. A contact hole CH is formed in the interlayer insulating layer 19*b* and the flattening layer 19*c*, and the first electrode 11, the second electrode 12, the third electrode 13 and the fourth electrode 14 are connected to the CS electrode CSE1 in the contact hole CH, and are electrically connected to the drain electrode DE via the CS electrode CSE1.

An insulating layer (fourth insulating layer) 19*d* is formed so as to cover the first electrode 11, the second electrode 12, the third electrode 13 and the fourth electrode 14. The insulating layer 19*d* is an SiN layer or $SiO_2$ layer having a thickness of 100 nm, for example. Note that the insulating layer 19d may be omitted. With the provision of the insulating layer 19d, it is possible to prevent the electrophoretic particles 32 from being stuck on the first substrate 10 and prevent inter-electrode leakage.

The light-blocking layer 21 is formed so as to be located in the light-blocking region R2 on a surface of the transparent substrate (e.g., a glass substrate) 20a of the second substrate 20 that is on the electrophoretic layer 30 side. The material of the light-blocking layer 21 is a black-colored acrylic resin or a low-reflectance metal material, for example. The first electrode 11, the second electrode 12, the third electrode 13 and the fourth electrode 14 of the first substrate 10 are placed so as to oppose the light-blocking layer 21 (i.e., in the light-blocking region R2).

A partition wall 33 that divides the electrophoretic layer 30 into pixels Px is provided between the first substrate 10 and the second substrate 20. The partition wall 33 is formed from a photoresist, for example. The height h of the partition wall 33 is 10 µm to 60 µm, for example, and the width th of the partition wall 33 is 10 µm to 60 µm, for example.

The dispersion medium 31 is an insulative, colorless and transparent liquid. The dispersion medium 31 may be isoparaffin, toluene, xylene, normal paraffin or silicone oil, which are hydrocarbon-based solvents, for example.

The electrophoretic particles 32 (the cyan particles 32C, the magenta particles 32M, the yellow particles 32Y and the black particles 32B) may be pigment particles of an intended color or resin particles including a pigment or a dye of an intended color therein. A pigment or a dye may be those that are ordinary and used in printing ink or color toner, for example. The threshold characteristics of the electrophoretic particles 32 (the applied voltage required for migration) can be determined by adjusting the amount of charge, the particle diameter, the particle surface shape, the material, etc. For example, the threshold characteristics of the plurality of types of electrophoretic particles 32 can be made different from each other by the approach disclosed in Japanese Patent No. 5333045. The entire disclosure of Japanese Patent No. 5333045 is incorporated herein by reference.

The average particle diameter (herein, the volume average diameter) of the electrophoretic particles 32 is typically 0.01 µm or more and 10 µm or less, and preferably 0.03 µm or more and 3 µm or less. When the volume average diameter of the electrophoretic particles 32 is less than 0.03 µm, the amount of charge of the electrophoretic particles 32 may be small and the migration speed may be slow. When the volume average diameter of the electrophoretic particles 32 is 3 µm or more, it may precipitate due to its own weight or the memory property thereof may deteriorate, though the migration speed is sufficient.

Note that the display device 100 does not need to include the partition wall 33 that divides the electrophoretic layer 30 into pixels Px. This is because the display device 100 is capable of subtractive color mixing within one pixel Px, and it is therefore not necessary to separately define pixels corresponding to different colors as with conventional electrophoretic displays. Since the display device 100 does not include the partition wall 33, it is possible to improve the aperture ratio.

When the partition wall 33 is omitted, the display device 100 includes, for example, a seal portion that is provided between the first substrate 10 and the second substrate 20 and surrounds the electrophoretic layer 30, and a plurality of spacers that are provided between the first substrate 10 and the second substrate 20 and define the thickness of the electrophoretic layer 30. The seal portion and the spacers can be formed in a manner similar to that for a seal portion and spacers of a liquid crystal display device.

[Realization of Gray Level Display by Adjusting the Number of Output Subframes]

In the present specification, a period of time that is assigned to display of a certain image is referred to as a "frame". Herein, one frame includes a plurality of vertical scanning periods (subframes). Gray level display is preferably realized by setting the length of time over which a predetermined electric field is applied to the electrophoretic layer 30 in the opening region R1 to a length that is equivalent to the vertical scanning period times n (n is an integer that is 1 or more) (i.e., a length that is equivalent to n subframes), i.e., by adjusting the number of subframes assigned to a period (output period) over which the electrophoretic particles 32 are output to the opening region R1. Thus, gray level display can be preferably realized by adjusting the output period by using one vertical scanning period of active matrix addressing as the smallest unit.

Figure 17:
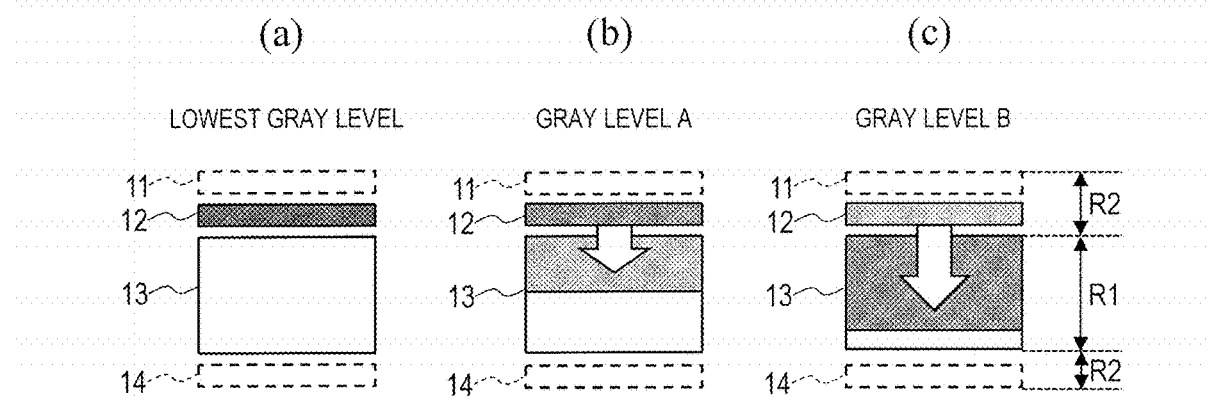
FIG. 17 (a) to (c) are diagrams schematically showing three states of the electrophoretic particles 32 of a particular color that are different from each other in terms of the amount of output to the opening region R1 (over the third electrode 13), wherein (a) shows a state in which the lowest gray level is displayed, (b) shows a state in which an intermediate gray level (gray level A) is displayed, and (c) shows a state in which an intermediate gray level (gray level B) that is higher than gray level A is displayed.

FIGS. 17(a), 17(b) and 17(c) schematically show three states of the electrophoretic particles 32 of a particular color that are different from each other in terms of the amount of output to the opening region R1 (over the third electrode 13). The shading of the second electrode 12 and that of the third electrode 13 shown in FIGS. 17(a), 17(b) and 17(c) each represent the amount of electrophoretic particles 32 of the particular color that are positioned over that electrode.

In the state shown in FIG. 17(a), the electrophoretic particles 32 of the particular color are all positioned over the second electrode 12 in the light-blocking region R2 and are not positioned over the third electrode 13 in the opening region R1. Thus, the state shown in FIG. 17(a) is a state in which the lowest gray level of the particular color is displayed.

In the state shown in FIG. 17(b), some of the electrophoretic particles 32 of the particular color are positioned over the third electrode 13. Thus, the state shown in FIG. 17(b) is a state in which an intermediate gray level (gray level A) is displayed.

Also in the state shown in FIG. 17(c), some of the electrophoretic particles 32 of the particular color are positioned over the third electrode 13. Note however that the amount of output to the third electrode 13 is greater than that in the state shown in FIG. 17(b). Therefore, the state shown in FIG. 17(c) is a state in which an intermediate gray level (gray level B) that is higher than gray level A is displayed.

Figure 18:
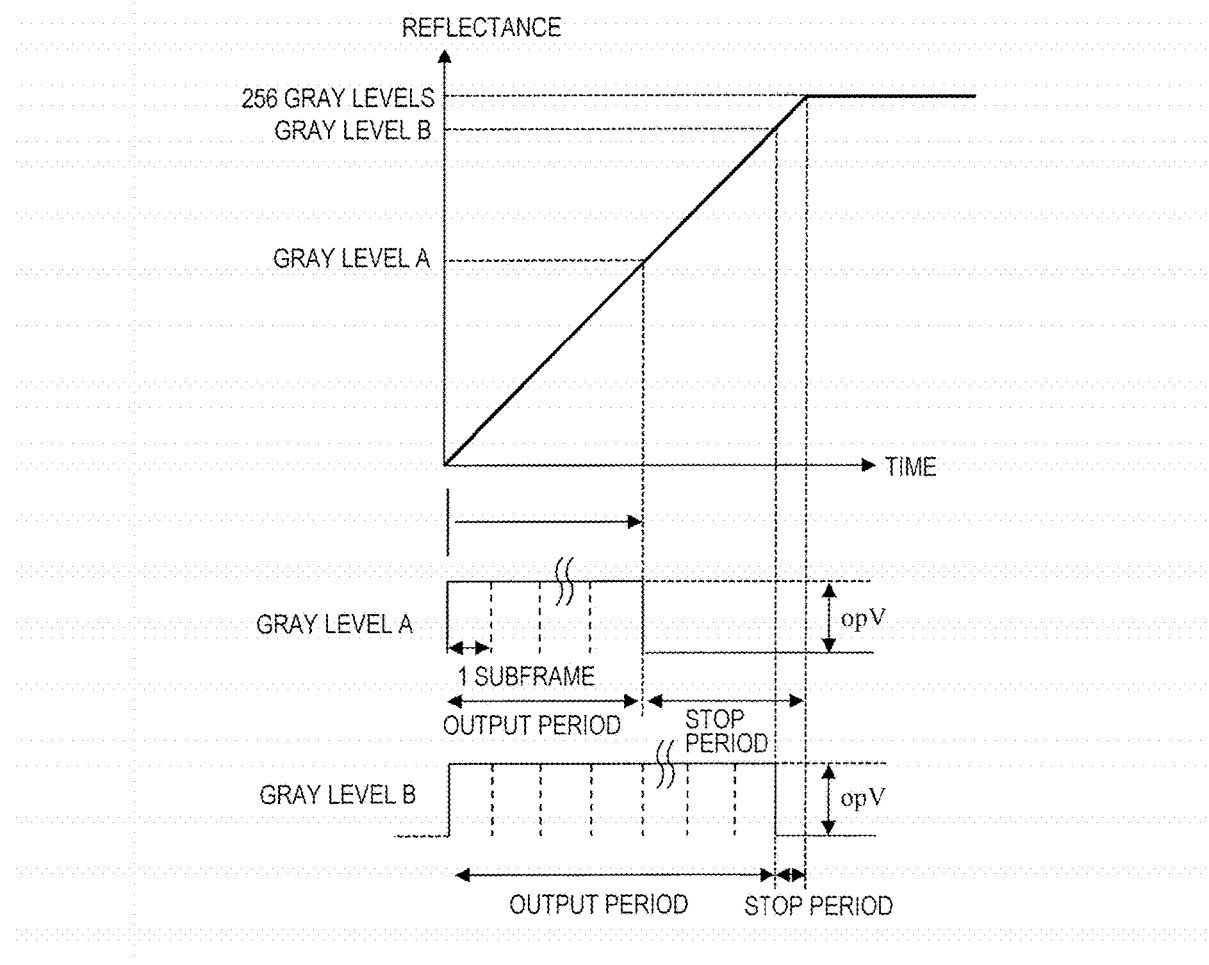
FIG. 18 A diagram showing an example waveform of an output voltage (the voltage applied to the third electrode 13) for realizing gray levels A and B.

FIG. 18 shows an example waveform of an output voltage (the voltage applied to the third electrode 13) for realizing gray levels A and B. Herein, a case is shown in which the time-reflectance characteristics is linear against a certain output voltage opV.

As shown in FIG. 18, when displaying gray level A, it is possible to realize a reflectance that corresponds to gray level A by assigning some of a plurality of subframes (vertical scanning periods) included in one frame to the output period (the remaining subframes being the stop period). When displaying gray level B, it is possible to realize a reflectance that corresponds to gray level B by assigning more subframes to the output period than when displaying gray level A.

As can be seen from the above description, gray level display can be preferably produced when, for example, the length of one frame is set to be substantially equal to the length of time (response time) from when a certain output voltage is applied to the third electrode 13 so that the electrophoretic particles 32 of a certain color start moving from over the second electrode 12 to over the third electrode 13 until the electrophoretic particles 32 of that color have completely moved to over the third electrode 13.

The power consumption can be reduced lower as the vertical scanning frequency is lower. Note however that as the vertical scanning frequency is lower, the response time of the electrophoretic particles 32 needs to be made longer, i.e., the response speed thereof needs to be made slower. Therefore, it is preferred to set the vertical scanning frequency while taking into consideration both the low power consumption and the response speed.

Specifically, in view of lowering the power consumption, the vertical scanning frequency is preferably 150 Hz or less. In view of realizing a sufficient number of gray levels when the vertical scanning frequency is 150 Hz or less, the response speed of the electrophoretic particles 32 is preferably 1 sec or more.

Figure 19:
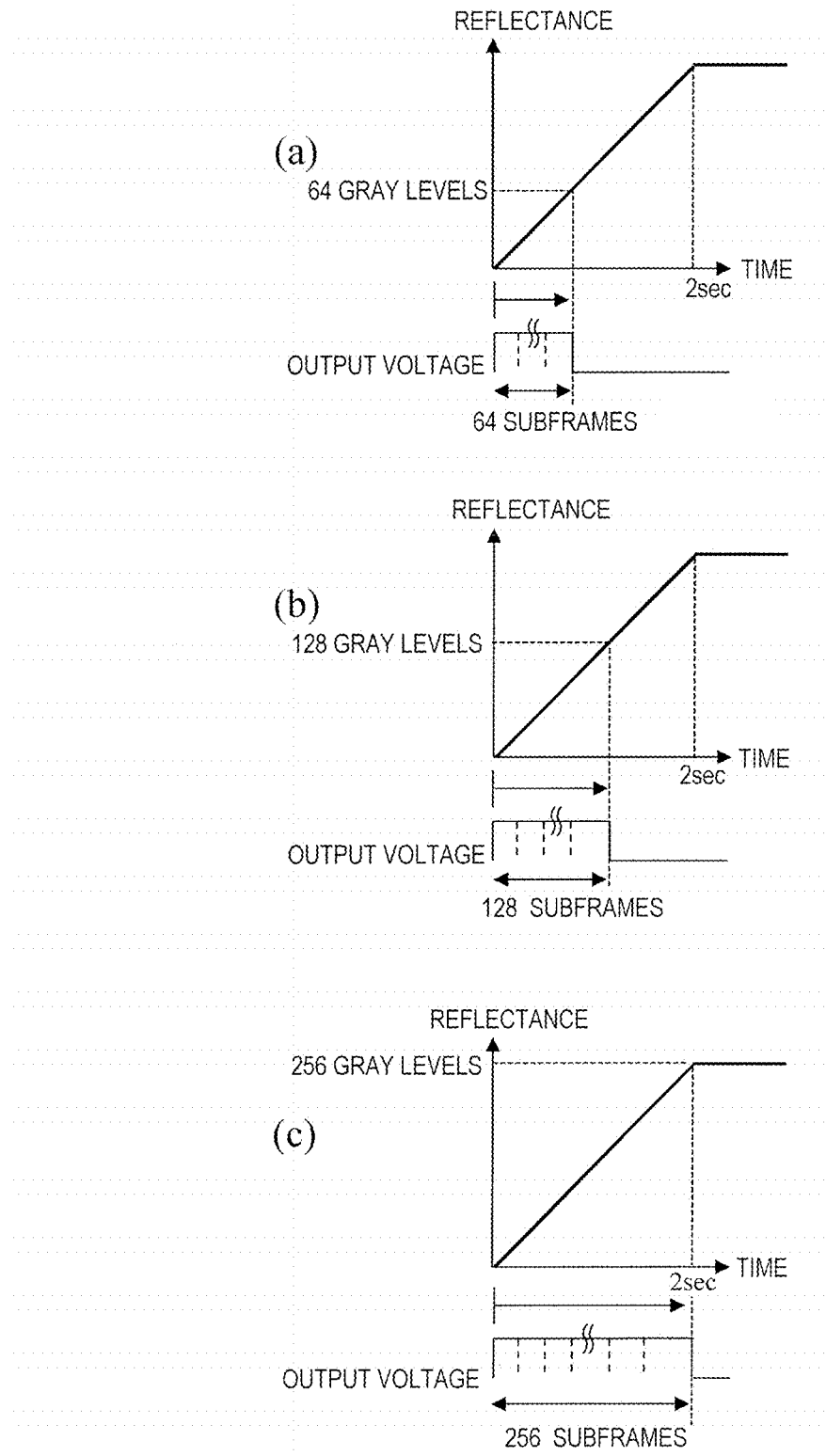
FIGS. 19 (a), (b) and (c) are diagrams showing output voltage waveforms for producing 64-gray-level display, 128-gray-level display and 256-gray-level display, respectively, where the vertical scanning frequency is about 128 Hz and the response speed of the electrophoretic particles 32 is about 2 sec.

For example, when the vertical scanning frequency is about 128 Hz and the response speed of the electrophoretic particles 32 is about 2 sec, one frame (about 2 sec) is composed of 256 subframes and it is possible to realize 256-gray-level display. FIGS. 19(a), 19(b) and 19(c) show output voltage waveforms for producing 64-gray-level display, 128-gray-level display and 256-gray-level display, respectively, wherein the vertical scanning frequency is about 128 Hz and the response speed of the electrophoretic particles 32 is about 2 sec. By assigning 64 subframes to the output period, as shown in FIG. 19(a), it is possible to obtain reflectances corresponding to 64 gray levels, thus realizing 64-gray-level display. By assigning 128 subframes to the output period, as shown in FIG. 19(b), it is possible to obtain reflectances corresponding to 128 gray levels, thus realizing 128-gray-level display. Moreover, by assigning 256 subframes to the output period, as shown in FIG. 19(c), it is possible to obtain reflectances corresponding to 256 gray levels, thus realizing 256-gray-level display.

Figure 20:
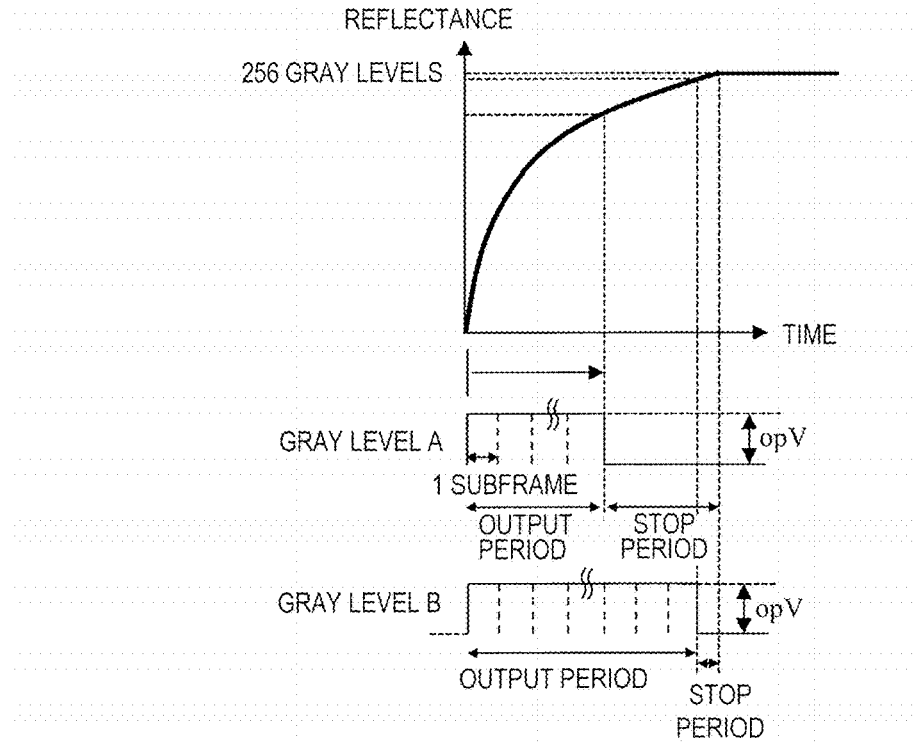
FIG. 20 A diagram showing an example in which the time-reflectance characteristics are non-linear against a certain output voltage.

Note that the time-reflectance characteristics may be non-linear against a certain output voltage opV, as shown in FIG. 20. In such a case, an intended reflectance may not be realized even if the number of subframes is set in accordance with the number of gray levels. For example, even when the length of the output period is set in accordance with the number of gray levels so as to display each of gray levels A and B, the obtained reflectances may not be those that correspond respectively to gray levels A and B. That is, gray levels cannot be defined evenly against the increase in the number of subframes.

Figure 21:
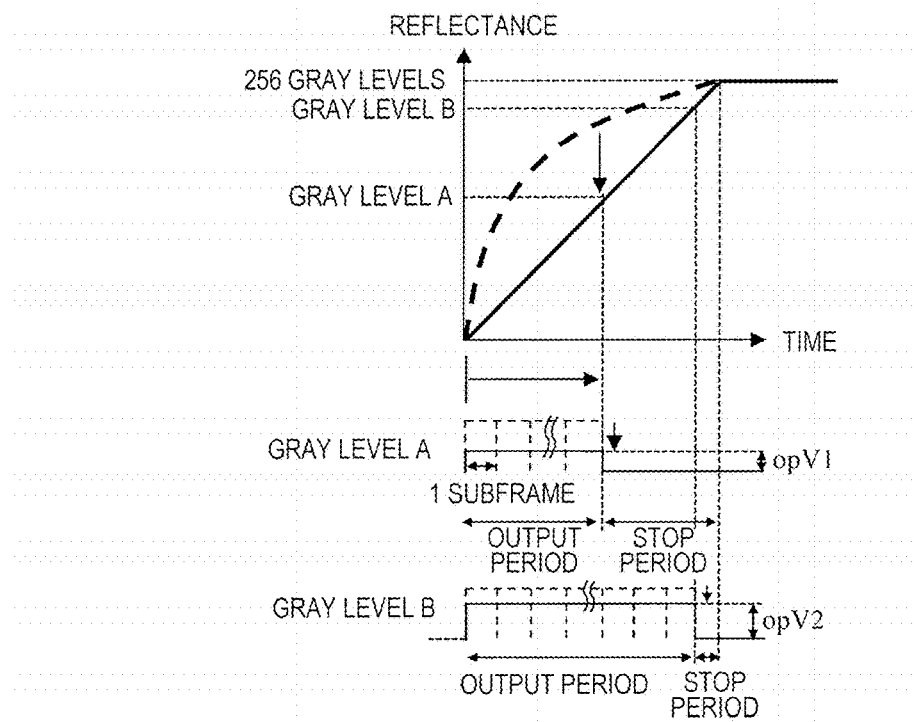
FIG. 21 A diagram showing an example in which the time-reflectance characteristics are made linear by adjusting the output voltage.

In contrast, the time-reflectance characteristics can be made linear (or closer to linear) by adjusting the level of the output voltage as shown in FIG. 21. In the example shown in FIG. 21, output voltages opV1 and opV2 that are different from the output voltage opV of the example shown in FIG. 20 are used for displaying gray levels A and B, respectively. Thus, it is possible to obtain reflectances that correspond respectively to gray levels A and B. That is, it is possible to define gray levels evenly against the increase in the number of subframes. Thus, a finer gray level representation can be realized by controlling the intensity of the electric field applied to the electrophoretic layer 30 in the opening region R1 while adjusting the level of the source voltage supplied from the source line (signal line) to the thin film transistor.

[Light-Reflecting Layer]

Figure 22:
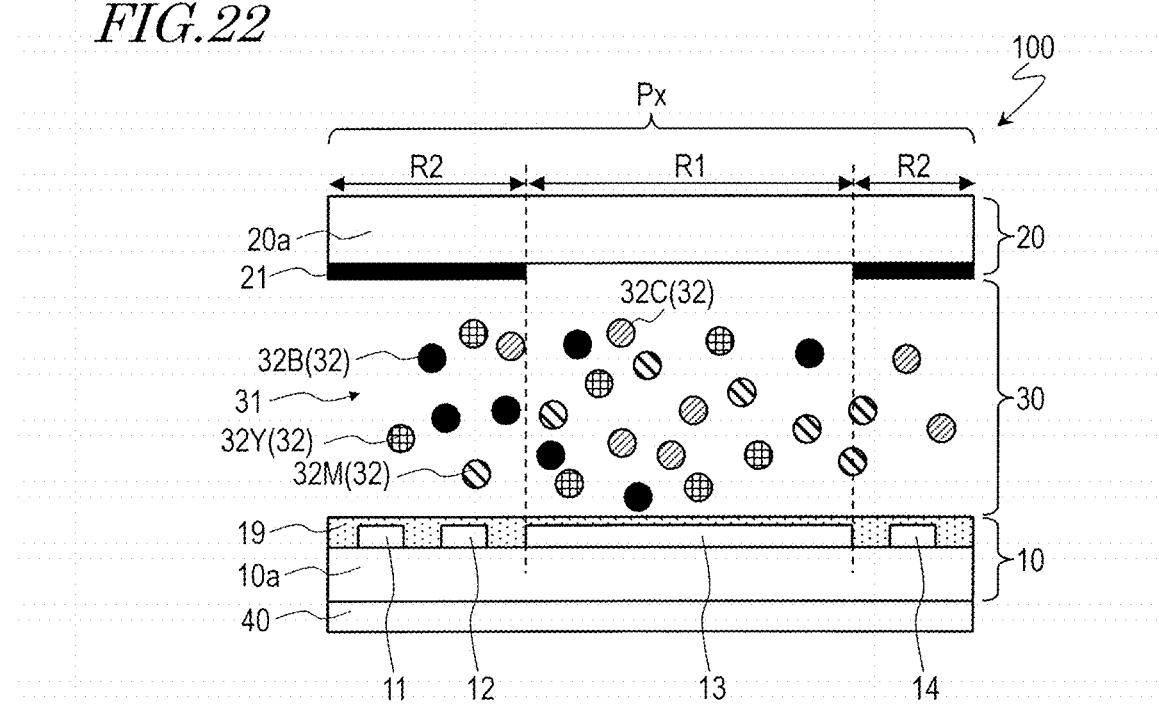
FIG. 22 A cross-sectional view schematically showing another configuration of the electrophoretic element 100 according to an embodiment of the present invention.

Although the description above illustrates a configuration in which the third electrode 13 is a reflective electrode, the electrophoretic element 100 of the present embodiment is not limited to such a configuration. As shown in FIG. 22, in the opening region R1, a white-colored light-reflecting layer 40 may be provided on the back side relative to the electrophoretic layer 30, and a transparent electrode may be used as the third electrode 13. Note that although FIG. 22 illustrates a configuration in which the light-reflecting layer 40 is placed on the back side of the transparent substrate 10a, the light-reflecting layer 40 may be provided on the front side of the transparent substrate 10a (i.e., between the transparent substrate 10a and the electrophoretic layer 30). The light-reflecting layer 40 may be a diffuse reflection layer that diffusively reflects light, or may be a specular reflection layer that specularly reflects light. When a specular reflection layer is used as the light-reflecting layer 40, it is preferably used in combination with a light diffusion layer (forward diffusion layer) provided on the front side relative to the electrophoretic layer 30.

The white-colored light-reflecting layer 40 may be a diffuse reflection film for a reflective liquid crystal display device (e.g., an aluminum vapor deposition film or a silver vapor deposition film). A combination of a diffusive film and a specular reflection film (e.g., an aluminum vapor deposition film or a silver vapor deposition film) may be used, instead of a diffuse reflection film.

Moreover, a white reflector for backlight of a liquid crystal display device may be used.

Note that the color of the light-reflecting layer 40 is not limited to a white color as illustrated above. The light-reflecting layer 50 may be in a black color or a particular chromatic color (e.g., cyan, magenta or yellow). A light-absorbing layer may be provided instead of the light-reflecting layer 50.

Figure 23:
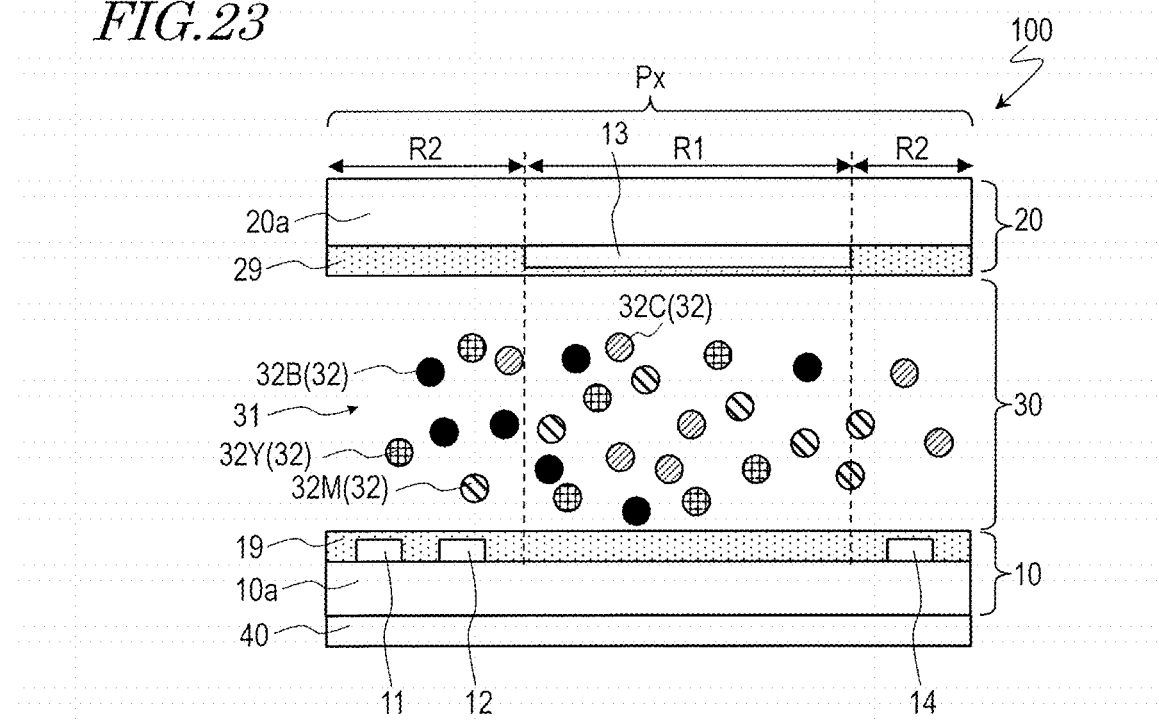
FIG. 23 A cross-sectional view schematically showing still another configuration of the electrophoretic element 100 according to an embodiment of the present invention.

Although the present embodiment illustrates a configuration in which the first substrate 10 includes the first electrode 11, the second electrode 12 and the third electrode 13 and the fourth electrode 14, the second substrate 20 may include the third electrode 13 as shown in FIG. 23. In the example shown in FIG. 23, the third electrode 13 is provided on the glass substrate 20a of the second substrate 20, and the insulating layer 29 is formed so as to cover the third electrode 13. Note that FIG. 23 does not show the light-blocking layer 21. Thus, the third electrode 13 positioned in the opening region R1 may be provided on the first substrate 10 side or may be provided on the second substrate 20 side. Also when the third electrode 13 is provided on the second substrate 20, as when it is provided on the first substrate 10 side, by controlling the first electrode 11, the second electrode 12, the potential of the third electrode 13 and the fourth electrode 14, it is possible to move one or more of the plurality of types of electrophoretic particles 32, each in an intended amount, to the opening region R1.

Embodiment 2

Figure 24:
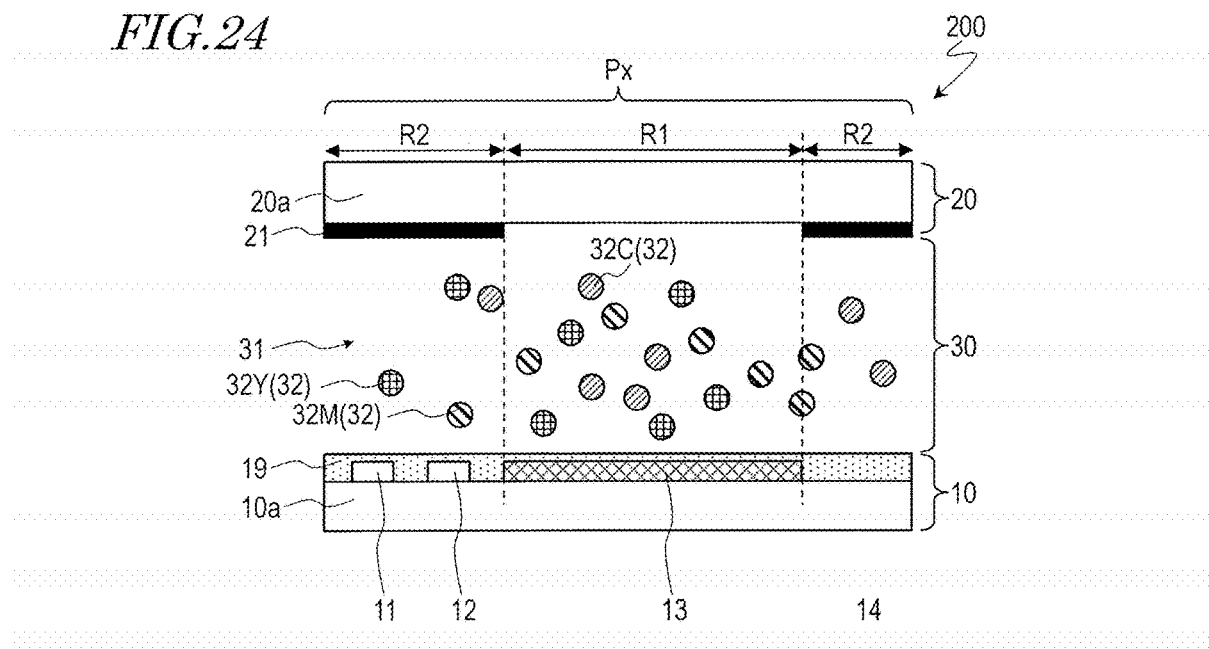
FIG. 24 A cross-sectional view schematically showing an electrophoretic element (display device) 200 according to an embodiment of the present invention.

FIG. 24 shows an electrophoretic element (display device) 200 of the present embodiment. FIG. 24 is a cross-sectional view schematically showing one pixel Px of the electrophoretic element 200.

As shown in FIG. 24, the electrophoretic element 200 includes the components of the electrophoretic element 100 of Embodiment 1, except for the black particles 32B and the fourth electrode 24. That is, the plurality of types of electrophoretic particles 32 in the electrophoretic layer 32 of the electrophoretic element 200 include the cyan particles 32C, the magenta particles 32M and the yellow particles 32Y but do not include the black particles 32B. The first substrate 10 of the electrophoretic element 200 includes three (three types of) electrodes, i.e., the first electrode 11, the second electrode 12 and the third electrode 13.

The electrophoretic element 200 of the present embodiment is capable of applying a transverse electric field to the electrophoretic layer 30 by controlling the potentials of the three electrodes 11, 12 and 13, and to thereby move (output) one or more of the plurality of types of electrophoretic particles 32, each in an intended amount, to the opening region R1. Display principles of the electrophoretic element 200 will now be described. First, the threshold characteristics of the electrophoretic particles 32 will be described.

[Threshold Characteristics of Electrophoretic Particles]

Figure 25:
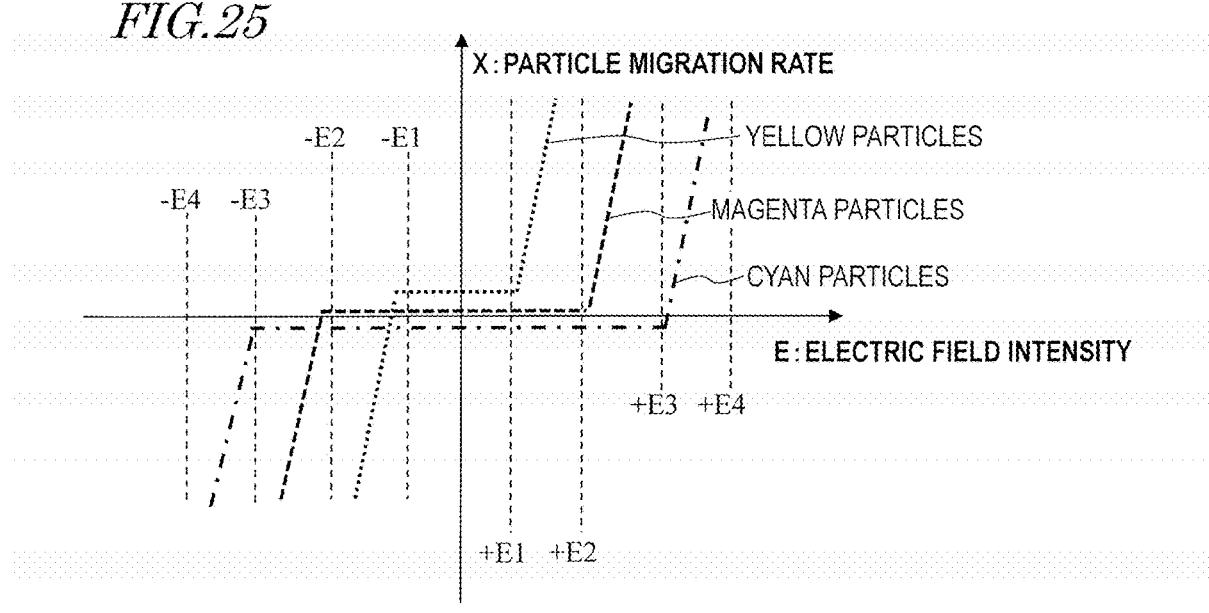
FIG. 25 A graph showing an example of threshold characteristics of the cyan particles 32C, the magenta particles 32M and the yellow particles 32Y included in the electrophoretic layer 30 of the electrophoretic element 200.

FIG. 25 shows an example of threshold characteristics of the cyan particles 32C, the magenta particles 32M and the yellow particles 32Y. FIG. 25 is a graph whose horizontal axis represents the electric field intensity E and whose vertical axis represents the particle migration rate X. As can be seen from FIG. 25, the cyan particles 32C move in the positive direction when +E3<E and move in the negative direction when E<−E3. Similarly, the magenta particles 32M move in the positive direction when +E2<E and move in the negative direction when E<−E2, and the yellow particles 32Y move in the positive direction when +E1<E and move in the negative direction when E<−E1.

Next, a display sequence for white display will be described.

[White Display (Reset)]

Figure 26:
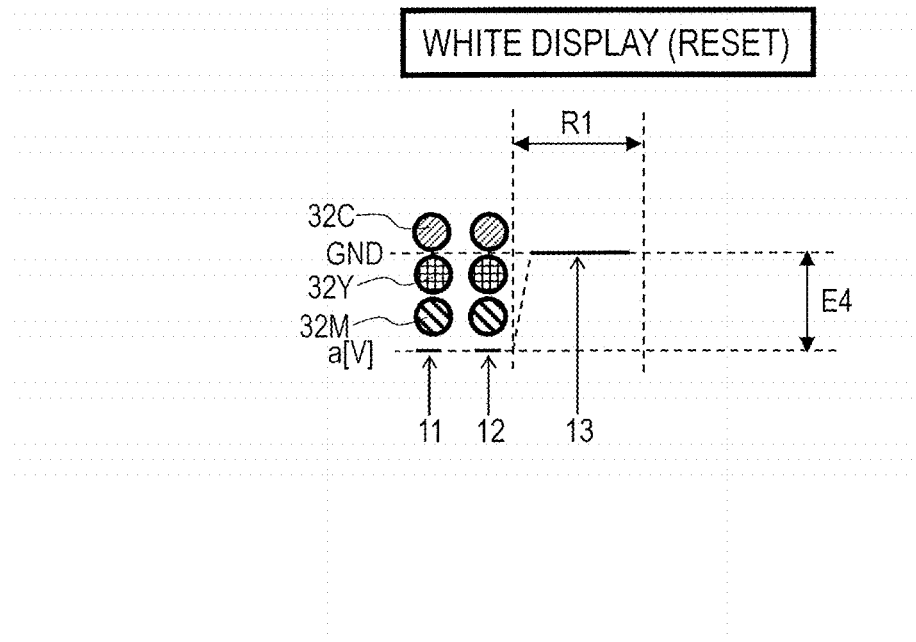
FIG. 26 A diagram illustrating a display sequence for white display.

FIG. 26 is a diagram illustrating a display sequence for white display. As shown in FIG. 26, the potentials of the first electrode 11 and the second electrode 12 are set to a [V], and the potential of the third electrode 13 is set to the ground potential GND. At this point, since a potential gradient corresponding to the electric field intensity E4 is formed between the second electrode 12 and the third electrode 13, the cyan particles 32C, the magenta particles 32M and the yellow particles 32Y are positioned over the first electrode 11 and the second electrode 12. In this state, since the electrophoretic particles 32 are absent in the opening region R1, the external light (ambient light) entering the electrophoretic layer 30 from the observer side is reflected by the light-reflecting layer 30, thereby producing white display.

Note that also with the electrophoretic element 200, switching from one color to another is basically done via this white display state. Therefore, white display can also be said to be a reset operation.

Next, display sequences for single-color display of cyan, magenta and yellow will be described.

[Cyan Display]

Figure 27:
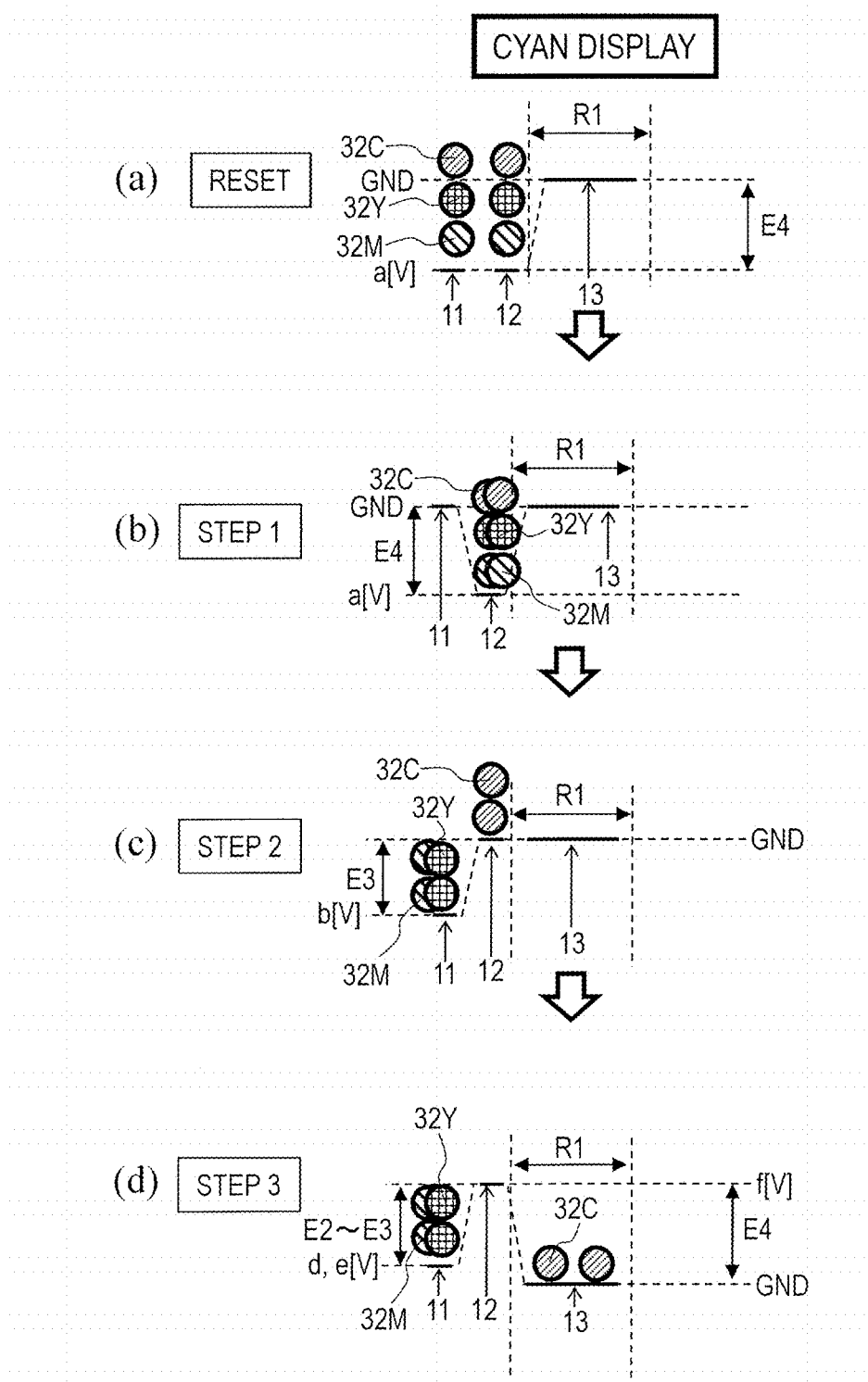
FIG. 27 (a) to (d) are diagrams illustrating a display sequence for cyan display.

FIGS. 27(a) to 27(d) are diagrams illustrating a display sequence for cyan display. First, as shown in FIG. 27(a), the same potentials as those in the white display state are applied to the first electrode 11, the second electrode 12 and the third electrode 13, thus resetting display.

Next, as shown in FIG. 27(b), the potential of the first electrode 11 is set to the ground potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the first electrode 11 to over the second electrode 12.

Next, as shown in FIG. 27(c), the potential of the first electrode 11 is set to b [V], and the potential of the second electrode 12 is set to the ground potential GND (step 2). At this point, since a potential gradient corresponding to the electric field intensity E3 is formed between the first electrode 11 and the second electrode 12, the magenta particles 32M and the yellow particles 32Y move from over the second electrode 11 to over the first electrode 11 (the cyan particles 32C that are over the second electrode 12 remain there).

Then, as shown in FIG. 27(d), the potential of the first electrode 11 is set to d [V] or e [V], and the potential of the second electrode 12 is set to f [V] (step 3). At this point, since a potential gradient corresponding to the electric field intensity E2 or E3 is formed between the first electrode 11 and the second electrode 12, and a potential gradient corresponding to the electric field intensity E4 is formed between the second electrode 12 and the third electrode 13, the cyan particles 32C move from over the second electrode 12 to the opening region R1 (over the third electrode 13). Therefore, in this state, cyan display is produced.

[Magenta Display]

Figure 28:
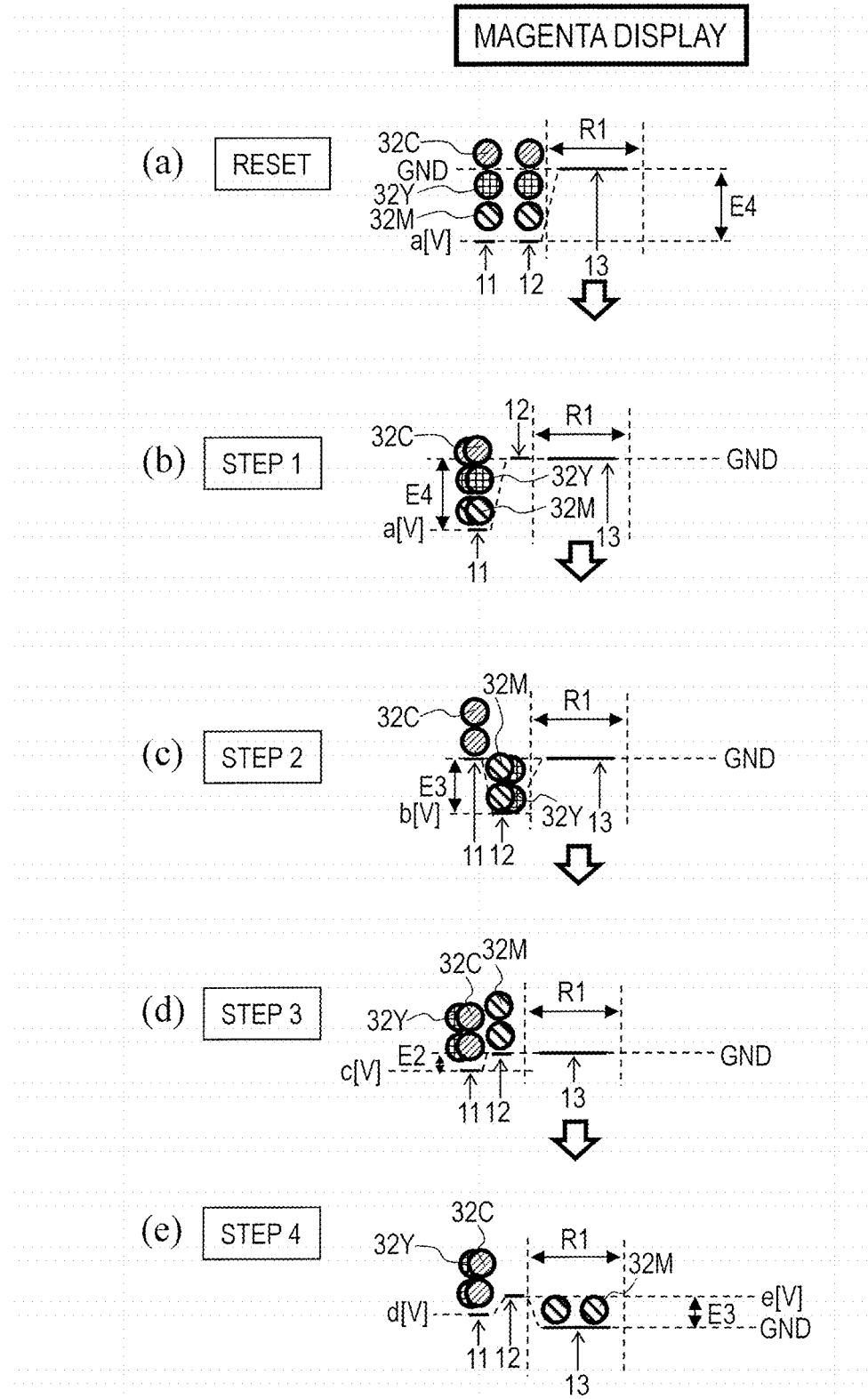
FIG. 28 (a) to (e) are diagrams illustrating a display sequence for magenta display.

FIGS. 28(a) to 28(e) are diagrams illustrating a display sequence for magenta display. First, as shown in FIG. 28(a), the same potentials as those in the white display state are applied to the first electrode 11, the second electrode 12 and the third electrode 13, thus resetting display.

Next, as shown in FIG. 28(b), the potential of the second electrode 12 is set to the ground potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 28(c), the potential of the first electrode 11 is set to the ground potential GND, and the potential of the second electrode 12 is set to b [V] (step 2). At this point, since a potential gradient corresponding to the electric field intensity E3 is formed between the first electrode 11 and the second electrode 12, the magenta particles 32M and the yellow particles 32Y move from over the first electrode 11 to over the second electrode 12 (the cyan particles 32C that are over the first electrode 11 remain there).

Next, as shown in FIG. 28(d), the potential of the first electrode 11 is set to c [V], and the potential of the second electrode 12 is set to the ground potential GND (step 3). At this point, since a potential gradient corresponding to the electric field intensity E2 is formed between the first electrode 11 and the second electrode 12, the yellow particles 32Y move from over the second electrode 12 to over the first electrode 11 (the magenta particles 32M that are over the second electrode 12 remain there).

Then, as shown in FIG. 28(e), the potential of the first electrode 11 is set to d [V], and the potential of the second electrode 12 is set to e [V] (step 4). At this point, since a potential gradient corresponding to the electric field intensity E3 is formed between the second electrode 12 and the third electrode 13, the magenta particles 32M move from over the second electrode 12 to the opening region R1 (over the third electrode 13). Therefore, in this state, magenta display is produced.

[Yellow Display]

Figure 29:
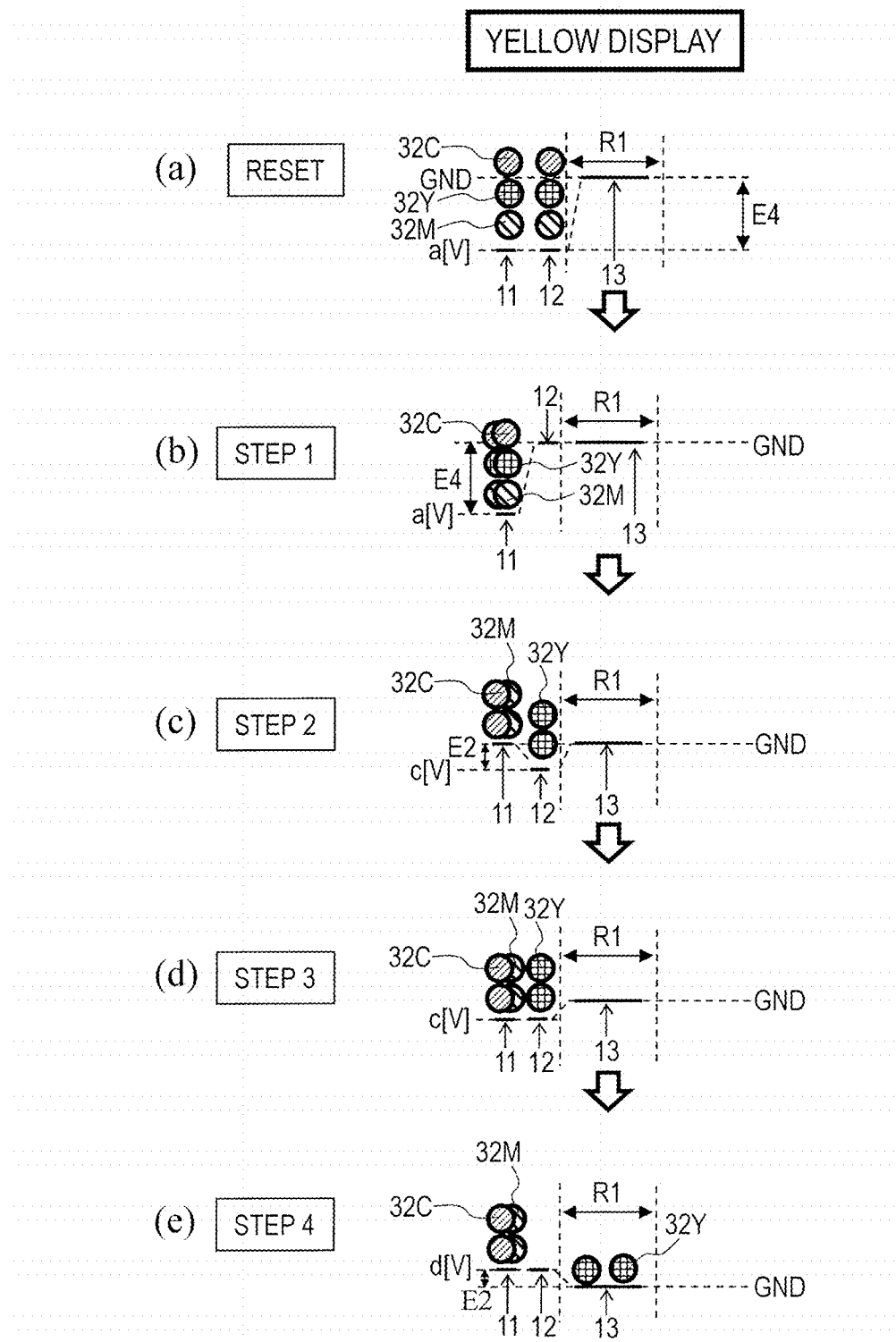
FIG. 29 (a) to (e) are diagrams illustrating a display sequence for yellow display.

FIGS. 29(a) to 29(e) are diagrams illustrating a display sequence for yellow display. First, as shown in FIG. 29(a), the same potentials as those in the white display state are applied to the first electrode 11, the second electrode 12 and the third electrode 13, thus resetting display.

Next, as shown in FIG. 29(b), the potential of the second electrode 12 is set to the ground potential GND (step 1). At this point, since a potential gradient corresponding to the electric field intensity E4 is formed between the first electrode 11 and the second electrode 12, the cyan particles 32C, the magenta particles 32M and the yellow particles 32Y move from over the second electrode 12 to over the first electrode 11.

Next, as shown in FIG. 29(c), the potential of the first electrode 11 is set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32C move from over the first electrode 11 to over the second electrode 12 (the cyan particles 32C and the magenta particles 32M that are over the first electrode 11 remain there).

Next, as shown in FIG. 29(d), the potential of the first electrode 11 is set to c [V] (step 3). At this point, since no such potential gradient that moves the electrophoretic particles 32 is formed between adjacent electrodes, the cyan particles 32C and the magenta particles 32M remain over the first electrode 11 and the yellow particles 32Y over the second electrode 12.

Then, as shown in FIG. 29(e), the potentials of the first electrode 11 and the second electrode 12 are set to d [V] (step 4). At this point, since a potential gradient corresponding to the electric field intensity E2 is formed between the second electrode 12 and the third electrode 13, the yellow particles 32Y move from over the second electrode 12 to the opening region R1 (over the third electrode 13). Therefore, in this state, yellow display is produced.

Next, display sequences for green display (mixed color display between cyan and yellow), blue display (mixed color display between cyan and magenta) and red display (mixed color display between magenta and yellow) will be described.

[Green Display]

Figure 30:
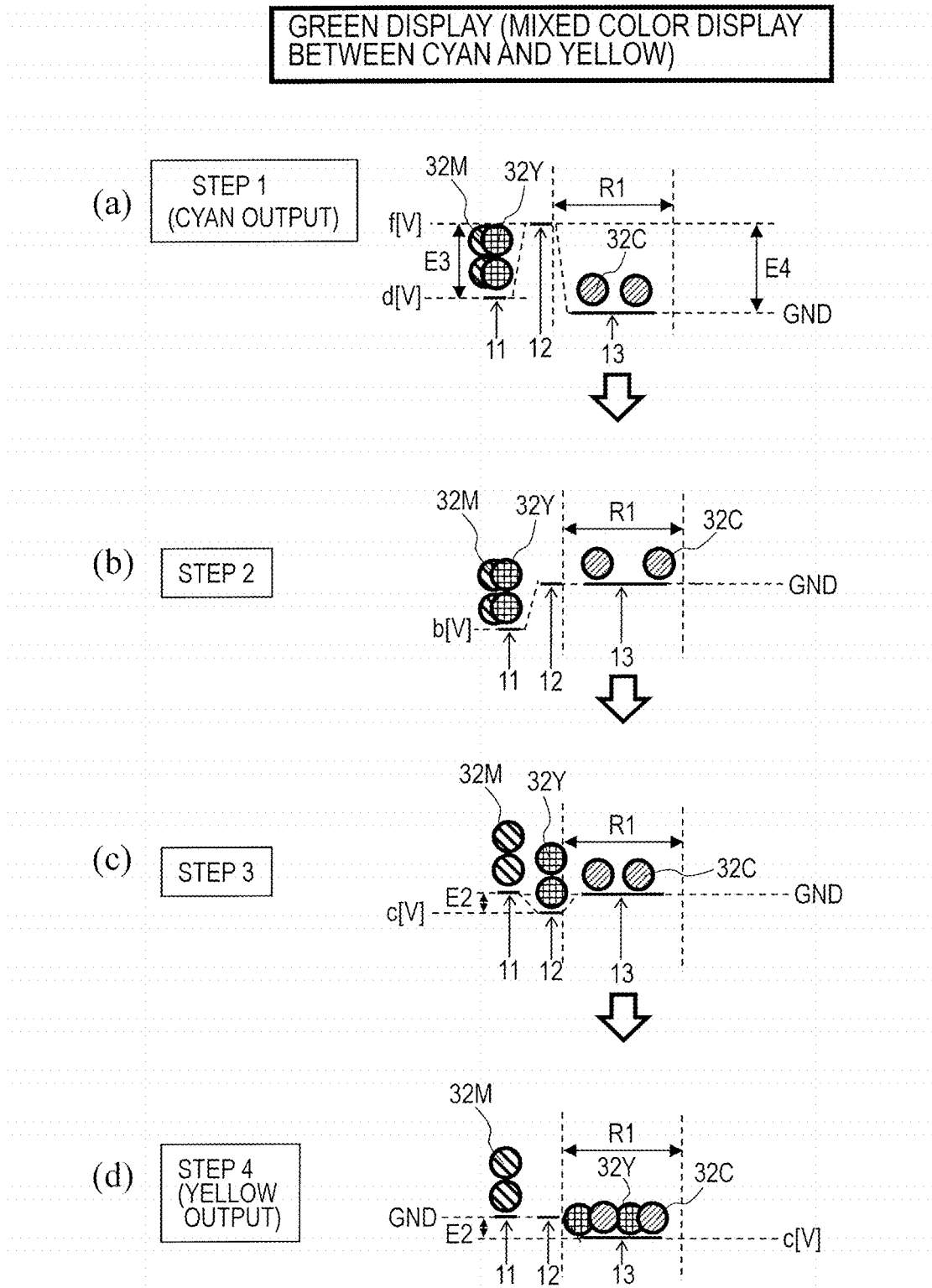
FIG. 30 (a) to (d) are diagrams illustrating a display sequence for green display.

FIGS. 30(a) to 30(d) are diagrams illustrating a display sequence for green display (i.e., mixed color display between cyan and yellow). First, as shown in FIG. 30(a), the cyan particles 32C are moved to the opening region R1, as in the display sequence for cyan display (step 1: cyan output).

Next, as shown in FIG. 30(b), the potential of the first electrode 11 is set to b [V], and the potential of the second electrode 12 is set to the ground potential GND (step 2). At this point, since no such potential gradient that moves the electrophoretic particles 32 is formed between adjacent electrodes the magenta particles 32M and the yellow particles 32Y remain over the first electrode 11 and the cyan particles 32C in the opening region R1.

Next, as shown in FIG. 30(c), the potential of the first electrode 11 is set to the ground potential GND, and the potential of the second electrode 12 is set to c [V] (step 3). At this point, since a potential gradient corresponding to the electric field intensity E2 is formed between the first electrode 11 and the second electrode 12, the yellow particles 32Y move from over the first electrode 11 to over the second electrode 12 (the magenta particles 32M that are over the first electrode 11 remain there).

Then, as shown in FIG. 30(d), the potential of the second electrode 12 is set to the ground potential GND, and the potential of the third electrode 13 is set to c [V] (step 4). At this point, since a potential gradient corresponding to the electric field intensity E2 is formed between the second electrode 12 and the third electrode 13, the yellow particles 32Y move from over the second electrode 12 to the opening region R1 (over the third electrode 13) (yellow output). Therefore, in this state, green display is produced by subtractive color mixing between cyan and yellow.

[Blue Display (Mixed Color Display Between Cyan and Magenta)]

Figure 31:
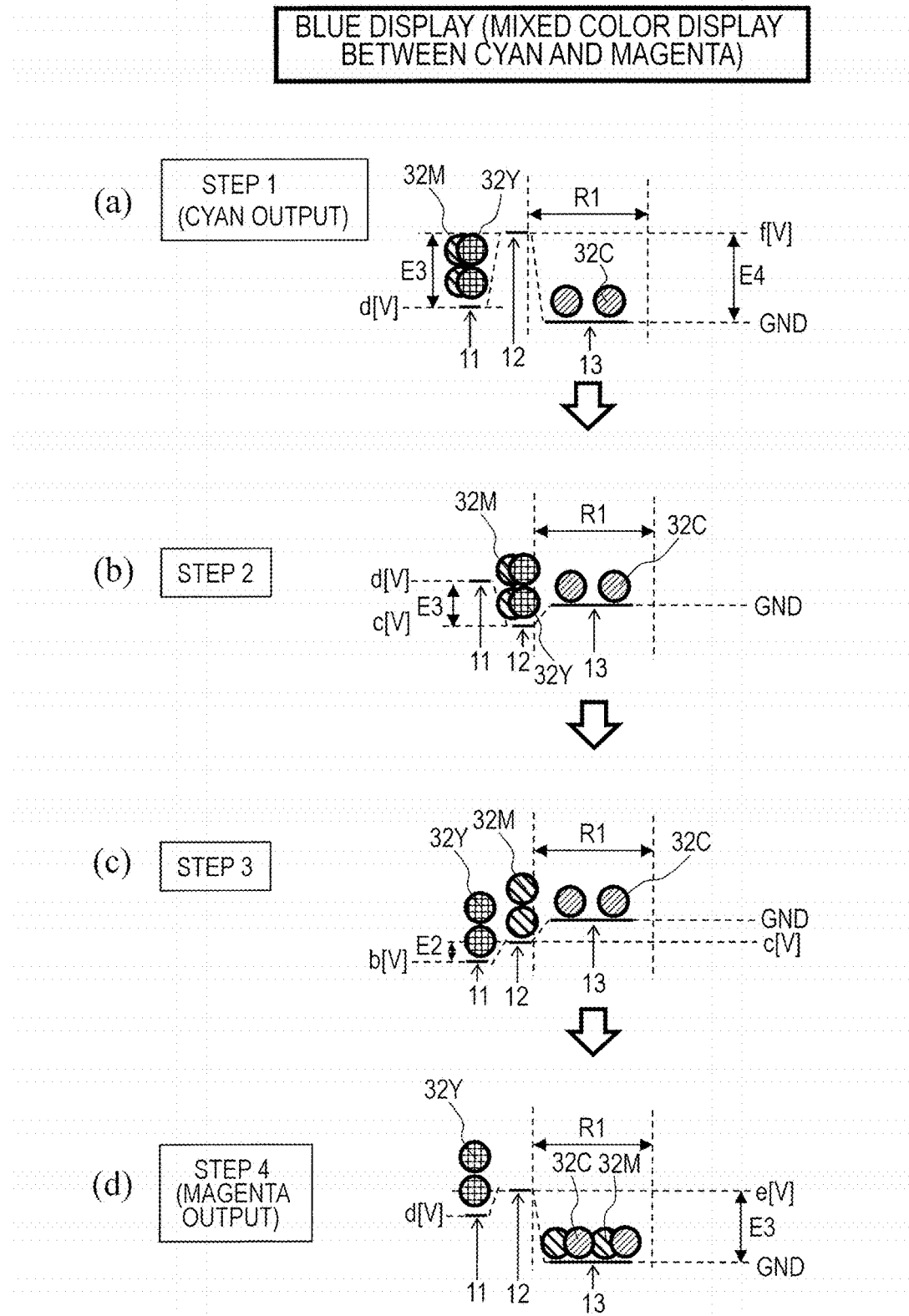
FIG. 31 (a) to (d) are diagrams illustrating a display sequence for blue display.

FIGS. 31(a) to 31(d) are diagrams illustrating a display sequence for blue display (i.e., mixed color display between cyan and magenta). First, as shown in FIG. 31(a), the cyan particles 32C are moved to the opening region R1, as in the display sequence for cyan display (step 1: cyan output).

Next, as shown in FIG. 31(b), the potential of the first electrode 11 is set to d [V], and the potential of the second electrode 12 is set to c [V] (step 2). At this point, since a potential gradient corresponding to the electric field intensity E3 is formed between the first electrode 11 and the second electrode 12, the magenta particles 32M and the yellow particles 32Y move from over the first electrode 11 to over the second electrode 12.

Next, as shown in FIG. 31(c), the potential of the first electrode 11 is set to b [V] (step 3). At this point, since a potential gradient corresponding to the electric field intensity E2 is formed between the first electrode 11 and the second electrode 12, the yellow particles 32Y move from over the second electrode 12 to over the first electrode 11 (the magenta particles 32M that are over the second electrode 12 remain there).

Then, as shown in FIG. 31(d), the potential of the first electrode 11 is set to d [V], and the potential of the second electrode 12 is set to e [V] (step 4). At this point, since a potential gradient corresponding to the electric field intensity E3 is formed between the second electrode 12 and the third electrode 13, the magenta particles 32M move from over the second electrode 12 to the opening region R1 (over the third electrode 13) (magenta output). Therefore, in this state, blue display is produced by subtractive color mixing between cyan and magenta.

[Red Display (Mixed Color Display Between Magenta and Yellow)]

Figure 32:
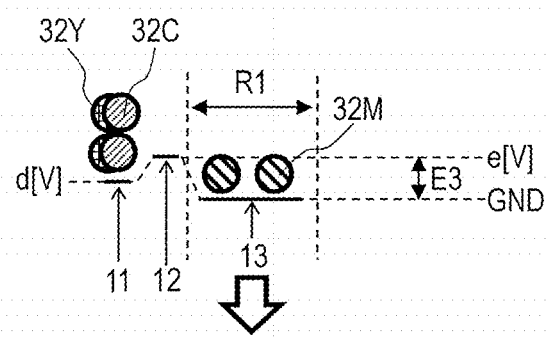
FIG. 32 (a) to (c) are diagrams illustrating a display sequence for red display.
Figure 32:
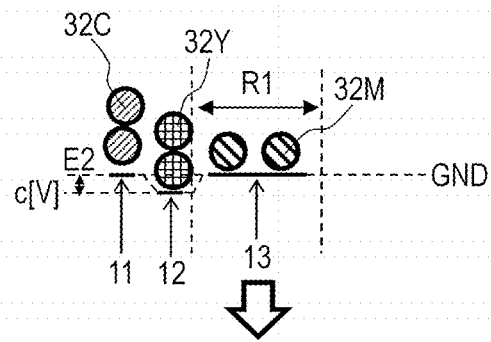
Figure 32:
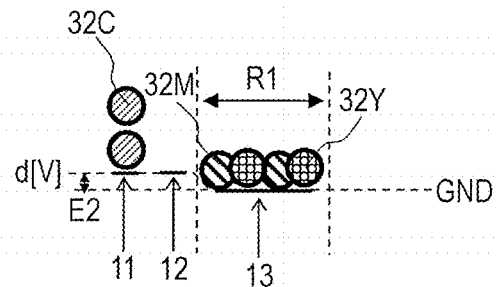

FIGS. 32(a) to 32(c) are diagrams illustrating a display sequence for red display (i.e., mixed color display between magenta and yellow). First, as shown in FIG. 32(a), the magenta particles 32M are moved to the opening region R1, as in the display sequence for magenta display (step 1: magenta output).

Next, as shown in FIG. 32(b), the potential of the first electrode 11 is set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32Y move from over the first electrode 11 to over the second electrode 12 (the cyan particles 32C that are over the first electrode 11 remain there).

Then, as shown in FIG. 32(c), the potentials of the first electrode 11 and the second electrode 12 are set to d [V] (step 4). At this point, since a potential gradient corresponding to the electric field intensity E2 is formed between the second electrode 12 and the third electrode 13, the yellow particles 32Y move from over the second electrode 12 to the opening region R1 (over the third electrode 13) (yellow output). Therefore, in this state, red display is produced by subtractive color mixing between magenta and yellow.

Next, a display sequence for black display (mixed color display between cyan, magenta and yellow) will be described.

[Black Display]

Figure 33:
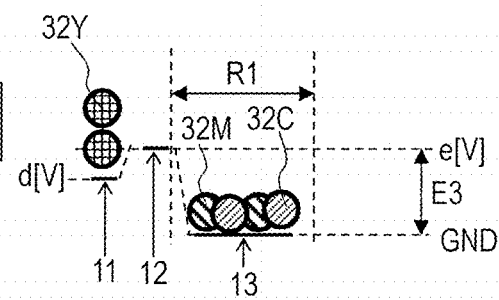
FIG. 33 (a) to (c) are diagrams illustrating a display sequence for black display.
Figure 33:
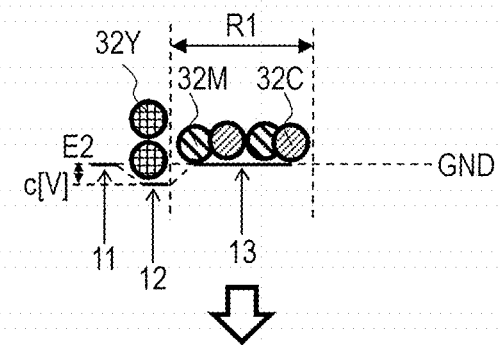
Figure 33:
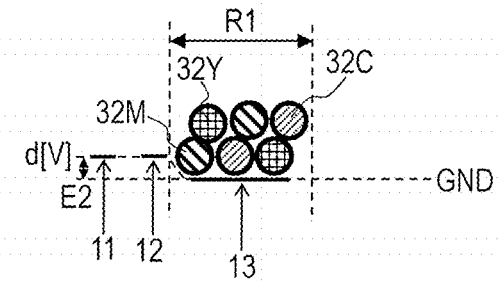
Figure 34:
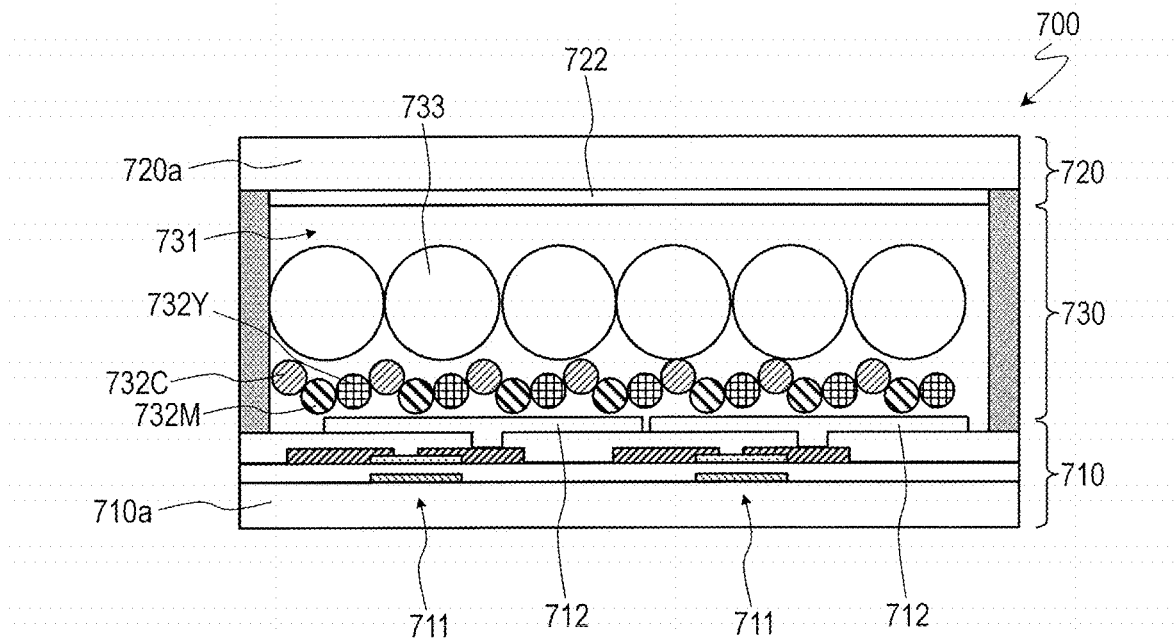
FIG. 34 A cross-sectional view schematically showing one pixel Px of the electrophoretic display 700 of Patent Document No. 1.
Figure 35:
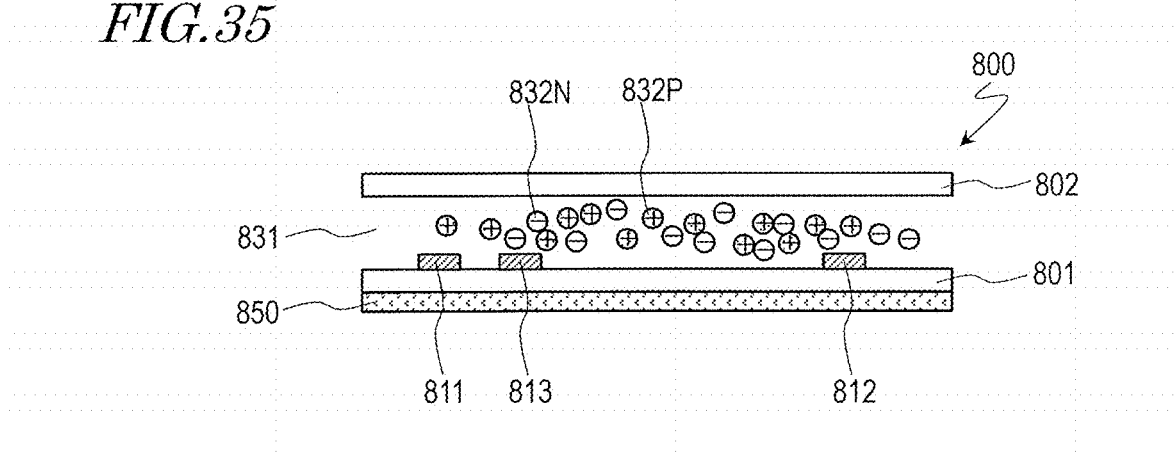
FIG. 35 A cross-sectional view schematically showing an area corresponding to one pixel of the electrophoretic display 800 of Non-Patent Document No. 1.

FIGS. 33(a) to 33(c) are diagrams illustrating a display sequence for black display (mixed color display between cyan, magenta and yellow). First, as shown in FIG. 33(a), the cyan particles 32C and the magenta particles 32M are moved to the opening region R1, as in the display sequence for blue display (step 1: cyan•magenta output).

Next, as shown in FIG. 33(b), the potential of the first electrode 11 is set to the ground potential GND, and the potential of the second electrode 12 is set to c [V] (step 2). At this point, since a potential gradient corresponding to the electric field intensity E2 is formed between the first electrode 11 and the second electrode 12, the yellow particles 32Y move from over the first electrode 11 to over the second electrode 12.

Then, as shown in FIG. 33(c), the potentials of the first electrode 11 and the second electrode 12 are set to d [V] (step 3: yellow output). At this point, since a potential gradient corresponding to the electric field intensity E2 is formed between the second electrode 12 and the third electrode 13, the yellow particles 32Y move from over the second electrode 12 to the opening region R1 (over the third electrode 13) (yellow output). Therefore, in this state, black display is produced by subtractive color mixing between cyan, magenta and yellow.

As described above, with the electrophoretic element 200 of the present embodiment, by controlling the potentials of the plurality of electrodes 11, 12 and 13 of the first substrate 10, it is possible to locate any one or more of the plurality of types of electrophoretic particles 32 in the opening region R1. Therefore, it is possible to produce display in which only one type of electrophoretic particles 32 is positioned in the opening region R1 (herein, cyan display, magenta display and yellow display), and it is possible to produce display in which none of the types of electrophoretic particles 32 is positioned in the opening region R1 (herein, white display). Moreover, with the electrophoretic element 100 of the present embodiment, it is also possible to produce display in which two or more of the plurality of types of electrophoretic particles 32 are positioned in the opening region R1 (e.g., green display, blue display, red display and black display illustrated above). Thus, it is possible to realize subtractive color mixing (superposition of colors) within a pixel Px, rather than juxtapositional color mixing (i.e., mixing or colors between pixels Px).

As already described above, the electrophoretic element 200 of the present embodiment is capable of moving the types of electrophoretic particles 32, each in an intended amount, to the opening region R1. That is, the migration of electrophoretic particles 32 to the opening region R1 can be controlled independently for each type, thus preventing crosstalk. Therefore, the number of gray levels can be increased significantly from those of conventional techniques, and it is possible to realize a fine gray level representation.

INDUSTRIAL APPLICABILITY

According to an embodiment of the present invention, it is possible to realize a fine gray level representation with an electrophoretic element capable of producing color display.

REFERENCE SIGNS LIST

10: First substrate
10a: Transparent substrate
11: First electrode
12: Second electrode
13: Third electrode
14: Fourth electrode
19: Insulating layer
20: Second substrate
20a: Transparent substrate
21: Light-blocking layer
29: Insulating layer
30: Electrophoretic layer
31: Dispersion medium
32: Electrophoretic particles
32C: Cyan particles
32M: Magenta particles
32Y: Yellow particles
32B: Black particles
33: Partition wall
40: Light-reflecting layer
100, 200: Electrophoretic element (display device)
Px: Pixel
R1: Opening region
R2: Light-blocking region

The invention claimed is:

1. An electrophoretic element comprising:
a first substrate and a second substrate facing each other,
an electrophoretic layer provided between the first substrate and the second substrate; and
a plurality of pixels each including an opening region through which light is transmitted from the electrophoretic layer to a front side, wherein:
in each of the plurality of pixels, the electrophoretic layer includes a dispersion medium, and a plurality of types of electrophoretic particles dispersed in the dispersion medium;
the plurality of types of electrophoretic particles include first electrophoretic particles and second electrophoretic particles that are charged with the same polarity; and a first threshold voltage at which the first electrophoretic particles start to move and a second threshold voltage at which the second electrophoretic particles start to move are different from each other;
in each of the plurality of pixels, the electrophoretic element includes at least three electrodes to which different potentials can be applied;
as seen from a layer normal direction of the electrophoretic layer, the at least three electrodes include a first electrode, a second electrode and a third electrode that are placed in this order along a certain direction that is parallel to a substrate surface of the first substrate; and the third electrode is provided in the opening region.

2. The electrophoretic element according to claim 1, wherein one or more of the plurality of types of electrophoretic particles can be moved, each in an intended amount, to the opening region by controlling potentials of the at least three electrodes.

3. The electrophoretic element according to claim 2, wherein when moving one of the plurality of types of electrophoretic particles to the opening region, only the electrophoretic particles of said one type are positioned over the second electrode and then moved to the opening region.

4. The electrophoretic element according to claim 2, wherein the intended amount is controlled by adjusting an intensity of an electric field applied to the electrophoretic layer in the opening region and/or a length of time over which the electric field is applied to the electrophoretic layer in the opening region.

5. The electrophoretic element according to claim 4, further comprising a thin film transistor electrically connected to each of the at least three electrodes, a scanning line electrically connected to a gate electrode of the thin film transistor, and a signal line electrically connected to a source electrode of the thin film transistor, thereby enabling active matrix driving, wherein a length of time over which an electric field is applied to the electrophoretic layer in the opening region is equivalent to a vertical scanning period times n (n is an integer that is 1 or more).

6. The electrophoretic element according to claim 5, wherein an intensity of an electric field applied to the electrophoretic layer in the opening region is controlled by adjusting a level of a source voltage supplied from the signal line to the thin film transistor.

7. The electrophoretic element according to claim 5, wherein a vertical scanning frequency is 150 Hz or less, and a response speed of the plurality of types of electrophoretic particles is 1 sec or more.

8. The electrophoretic element according to claim 1, wherein the plurality of types of electrophoretic particles further include third electrophoretic particles that are charged with the same polarity as the first electrophoretic particles and the second electrophoretic particles and have different threshold characteristics from the first electrophoretic particles and the second electrophoretic particles.

9. The electrophoretic element according to claim 8, wherein the first electrophoretic particles, the second electrophoretic particles and the third electrophoretic particles are cyan-colored electrophoretic particles, magenta-colored electrophoretic particles and yellow-colored electrophoretic particles.

10. The electrophoretic element according to claim 8, wherein the plurality of types of electrophoretic particles further include fourth electrophoretic particles that are charged with a different polarity from the first electrophoretic particles, the second electrophoretic particles and the third electrophoretic particles.

11. The electrophoretic element according to claim 10, wherein the fourth electrophoretic particles are black-colored electrophoretic particles.

12. The electrophoretic element according to claim 10, wherein:
   the at least three electrodes further include a fourth electrode; and
   as seen from a layer normal direction of the electrophoretic layer, the first electrode, the second electrode, the third electrode and the fourth electrode are placed in this order along the certain direction that is parallel to the substrate surface of the first substrate.

13. The electrophoretic element according to claim 1, wherein the third electrode is a reflective electrode having a light-reflecting property.

14. The electrophoretic element according to claim 1, wherein the first substrate includes the first electrode, the second electrode and the third electrode.

15. The electrophoretic element according to claim 1, wherein:
   the first substrate includes the first electrode and the second electrode; and
   the second substrate includes the third electrode.

16. A display device comprising the electrophoretic element according to claim 1.

* * * * *